(12) United States Patent
Chang et al.

(10) Patent No.: US 8,022,144 B2
(45) Date of Patent: *Sep. 20, 2011

(54) PROPYLENE-BASED ELASTOMERIC COMPOSITION

(75) Inventors: Andy C. Chang, Houston, TX (US); Thomas G. Pressly, San Antonio, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/010,558

(22) Filed: Jan. 20, 2011

(65) Prior Publication Data

US 2011/0118418 A1    May 19, 2011

Related U.S. Application Data

(62) Division of application No. 12/088,785, filed as application No. PCT/US2006/042447 on Oct. 31, 2006, now Pat. No. 7,893,161.

(60) Provisional application No. 60/731,885, filed on Oct. 31, 2005.

(51) Int. Cl.
*C08L 23/00* (2006.01)
*C08L 23/04* (2006.01)
*C08L 23/10* (2006.01)

(52) U.S. Cl. .......................... 525/191; 525/240

(58) Field of Classification Search .................. 525/191, 525/240
See application file for complete search history.

(56) References Cited

U.S. PATENT DOCUMENTS

| | | | |
|---|---|---|---|
| 5,008,204 A | 4/1991 | Stehling | |
| 5,272,236 A | 12/1993 | Lai et al. | |
| 5,278,272 A | 1/1994 | Lai et al. | |
| 5,504,172 A | 4/1996 | Imuta et al. | |
| 5,616,664 A | 4/1997 | Timmers et al. | |
| 6,054,544 A | 4/2000 | Finlayson et al. | |
| 6,319,998 B1 | 11/2001 | Cozewith et al. | |
| 6,395,321 B1 | 5/2002 | Shaft et al. | |
| 6,841,502 B2 | 1/2005 | Boussie et al. | |
| 6,869,904 B2 | 3/2005 | Boussie et al. | |
| 6,897,276 B2 | 5/2005 | Boussie et al. | |
| 6,960,635 B2 | 11/2005 | Stevens et al. | |
| 7,893,161 B2 * | 2/2011 | Chang et al. .................. | 525/191 |
| 2003/0176603 A1 | 9/2003 | Ommundsen et al. | |
| 2003/0204017 A1 | 10/2003 | Stevens et al. | |
| 2003/0216494 A1 | 11/2003 | Roth et al. | |
| 2007/0277450 A1 | 12/2007 | Raulie | |

FOREIGN PATENT DOCUMENTS

| | | |
|---|---|---|
| EP | 0716121 A1 | 6/1996 |
| WO | 9300448 A1 | 1/1993 |
| WO | 0001745 A1 | 1/2000 |
| WO | 03040095 A2 | 5/2003 |
| WO | 03040201 A1 | 5/2003 |
| WO | 2006044149 A1 | 4/2006 |

OTHER PUBLICATIONS

Randall, Journal of Macromolecular, Reviews in Macromolecular Chemistry and Physics, C29 (2&3), 201-317 (1989).
E.P. Otocka et al., Macromolecules, 4, 507-514 (1971).
Th.G. Scholte et al., J. Appl. Polym. Polym. Sci., 29, 3763-3782 (1984).
Iida et al., Tetrahedron Lett., 2001, 42, 4841-4844.
Wild, et al., Journal of Polymer Science: Polymer Physics Ed., 20, 441-455 (1982).
Hazlitt, Journal of Applied Polymer Science: Appl. Polym. Symp., 45, 25-37 (1990).

* cited by examiner

*Primary Examiner* — Nathan M Nutter
(74) *Attorney, Agent, or Firm* — Whyte Hirschboeck Dudek SC

(57) ABSTRACT

The present invention includes a polyolefin elastomeric composition comprising a propylene-based elastomer having at least seventy five weight percent units derived from propylene, the propylene-based elastomer exhibiting a heat of fusion of from 1 to 35 Joules/gram, a weight average molecular weight of from 5400 to 875000 g/mol, and a permanent set of less than 40%; and a homogeneous ethylene-alpha olefin interpolymer having a molecular weight distribution of less than 3.5, a density from 0.885 to 0.915 g/ml, and a heat of fusion of from 65 to 125 Joules/gram, wherein the ratio of the propylene-based elastomer to the homogeneous ethylene-alpha olefin interpolymer is from 97:3 to 80:20, and wherein the composition exhibits a heat of fusion from 2 to 55 Joules/gram, and a 2% secant flexural modulus of less than 69 MPa.

20 Claims, 8 Drawing Sheets

PROPYLENE-BASED ELASTOMERIC COMPOSITION

CROSS REFERENCE TO RELATED APPLICATIONS

This application is a divisional of U.S. Ser. No. 12/088,785, filed Mar. 31, 2008 now U.S. Pat. No. 7,893,161, which is the national stage entry of PCT/US06/42447, filed Oct. 31, 2006 which claims priority to U.S. Provisional Application No. 60/731,885, filed Oct. 31, 2005. For purposes of United States patent practice, the contents of this provisional application are herein incorporated by reference.

FIELD

This invention pertains to polyolefin elastomeric compositions manufactured using a solution manufacturing process. More particularly, the invention pertains to polyolefin elastomeric compositions containing a propylene-based elastomer and a minor amount of a homogeneous ethylene-alpha olefin interpolymer.

BACKGROUND

Propylene-based elastomers are disclosed in the art. For some end-use applications, such as injection molded articles, thermoformed articles, sheet/film and profile extruded articles these elastomers may exhibit advantageous characteristics versus ethylene-based elastomers. The propylene-based elastomer may be utilized in an end-use application which contains another propylene-based polymer (such as homopolymer polypropylene (hPP), random copolymer polypropylene (RCPP) and/or impact copolymer (ICP) (see, for example, EP0716121A1).

Elastomeric materials tend to have lower crystallinity (typically, heats of fusion between about 1 and 35 J/gram for propylene-based elastomers). These elastomers tend to be softer than typical propylene-based polymers. As a result, the elastomers can stick together at various stages beginning in manufacture (i.e. blocking during and immediately after manufacture), and during various stages of storage and transport, and use by polymer converters.

The tendency for elastomers to stick together can be especially difficult where the elastomer is formed into pellets during manufacture. It is typical for elastomers to stick together soon after formation into pellets before the elastomer is completely cooled. Because propylene-based polymers crystallize significantly more slowly than ethylene-based polymers of equivalent density, they can take longer to develop their full crystallinity. As a consequence, stickiness is particularly problematic for propylene-based elastomers. This characteristic of propylene-based elastomers can create problems and blockages during transport through the polymer manufacturing facility, thereby reducing the rate at which the elastomer is manufactured.

Even after the pellets have been produced in the manufacturing facility with minimal blocking, additional blocking can develop over time at temperature and pressure during storage and transport. Blocking of this type typically occurs as a result of pressure being exerted upon the pellets at various temperatures in containers such as boxes, bags, rail cars, trucks, or silos. This phenomenon can be described as the delayed onset of blocking and is a common problem with lower crystallinity elastomers. Though not intended to be limited by theory, it is thought that thermodynamics drives phase separation at use temperature (i.e. 0 to 65.6° C.) for propylene-based elastomers. Amorphous species (lower molecular weight or otherwise) can migrate ("bloom") to the surface. It is believed that the homogeneous ethylene-alpha olefin interpolymer component of this invention can minimize this blooming of such amorphous species and also nucleate propylene segment crystallinity, thereby minimizing blocking of the elastomer during the manufacture, shipping, and storage of the elastomer to end-use locations/facilities.

The pellets are conveyed from the polymer manufacturer to the end-use converter where they typically are transferred to holding containers and the like and/or directly to converting equipment. During transport, storage, and use, the pellets preferably should be readily separable from one another with a minimum amount of effort. In the worst case scenario, conversion of the elastomer pellets into end-use articles may be slowed, interrupted, or halted altogether if the pellets form large blocks within the process stream of the article fabrication equipment.

Various additive strategies (i.e. addition of additives, such as slip agents, anti-blocks, oils etc.) and mechanical strategies (i.e. agitation and break-up by means of additional equipment) have been attempted to compensate for the stickiness of elastomeric polymers. However, these so-called remedies often entail significant penalties such as additional costs and may also adversely affect the key properties of the elastomeric polymer. For example, the anti-block additives and modifiers may significantly compromise the optical properties of the propylene-based elastomer and/or the soft flexible behavior of the propylene-based elastomer materials. Homopolymer polypropylenes can be added to the propylene-based elastomer during manufacture, however, such polypropylene will increase the stiffness of the composition and decrease the elastic recovery, which may be unacceptable for some end-use applications.

Elastomeric compositions consisting of an in-reactor blend of a propylene-rich elastomer and an elastomeric polymer that is either non-crystalline or has very low crystallinity and ethylene derived crystallinity are proposed in WO 2006/044149A1. However, such non-crystalline or slowly crystallizing materials, such as low crystallinity elastomers will not significantly improve the stickiness and/or blocking behavior of an elastomeric blend, which includes slow crystallizing propylene-rich elastomers. Additionally, it is believed that the inclusion of such non-crystalline or low crystalline ethylene derived elastomers in a blend which further includes a polypropylene in addition to the propylene-based elastomers will result in unacceptable high haze and low clarity values for certain end-use applications. Furthermore, in some applications, the stiffness of the overall composition will be inadequate.

It would be desirable to have polyolefin elastomeric compositions, which contain a propylene-based elastomer and exhibit excellent physical properties, such as flexibility, while at the same time exhibiting low stickiness and blocking behavior in order to enable the compositions to be effectively and readily manufactured without manufacturing upsets due to blocking of the polymer handling facilities of the manufacturing plant. It would also be desirable for such compositions to be resistant to the delayed onset of blocking during shipping and storage. Preferably, such elastomeric compositions will be compatible with both propylene-based polymers and ethylene-based polymers. Finally, it would be beneficial for such compositions to exhibit excellent optical properties when blended with ethylene-based and propylene-based polymers.

OBJECTS OF THE INVENTION

One object of the invention is to provide a composition containing a majority of a propylene-based elastomer and also containing a minority of a homogeneous ethylene-alpha olefin interpolymer. The composition exhibits acceptable haze and low blocking characteristics and is capable of being formed into articles in processes which utilize regrind scrap material in the article manufacture process, without a substantial degradation of the physical properties exhibited by the final article. Preferably, the article will exhibit acceptable optical properties, such as low haze and high gloss.

Another object of the invention is to provide the above composition wherein the homogeneous ethylene-alpha olefin interpolymer comprises a polymer comprising ethylene and a C4 to C20 alpha olefin. The alpha olefin is preferably a C4 to C10 olefin; more preferably C4, C5, C6, C7, C8 alpha-olefins and 4-methyl-1-pentene; further more preferably 1-butene, 1-hexene and 1-octene; and most preferably 1-octene.

Another object of invention is to provide a composition that achieves greater crystallization for a given cooling condition. Higher peak crystallization temperature is indicative of greater crystallization at a given temperature below the peak crystallization temperature (Tc). Compared to the peak crystallization temperature of the propylene-based elastomer alone, the peak crystallization temperature of the inventive composition is at least 9° C. higher, more preferably at least 20° C. higher, further more preferably at least 30° C. higher, and most preferably at least 40° C. higher, and in some instances at least 60° C. higher than the propylene-based elastomer alone. The higher peak crystallization temperature and faster crystallization rate is a result of the use of a plastomeric ethylene alpha-olefin interpolymer, such as described in the current invention, which tend to crystallize relatively quickly compared to ethylene-based elastomers and propylene-based elastomers. If the propylene-based elastomer alone does not exhibit a peak crystallization temperature, then the change in crystallization temperature of the composition relative to the propylene-based elastomer is defined as amount the crystallization temperature is above 0° C. These compositions will provide reduced stickiness and blocking behavior compared to the propylene-based elastomers alone, but will still provide excellent softness, elasticity, and preferably excellent optical properties in the end use applications.

Still another object of the invention is to provide any of the above compositions wherein the homogeneous ethylene-alpha olefin interpolymer exhibits a narrow molecular weight distribution (MWD less than 3.5) as measured by GPC according to the procedure described in U.S. Pat. No. 5,272,236, preferably less than 3.0, and more preferably less than 2.5.

A still further object of the invention is to provide the above composition wherein the ethylene-alpha olefin interpolymer exhibits both a narrow molecular weight distribution and a narrow crystallinity distribution.

Another object of the invention is to provide a composition as described above, wherein the composition is also soft (low tensile modulus), flexible (low flexural modulus), and elastic.

A final object of the invention is to combine the propylene-based elastomer with the homogeneous ethylene-alpha olefin interpolymer prior to pelletization at the polymer manufacturing plant, in order to ease the handling and transport of the polymer pellets through the manufacturing facility.

The novel polymeric compositions of the invention are advantaged because they require less effort to use and will need fewer additives (such as slip and anti-blocking agents) at lower levels. Furthermore, the desirable mechanical properties such as flexibility, elasticity, and modulus (i.e. softness), respectively, are surprisingly maintained as compared with a propylene-based elastomer blended with polypropylene, while other properties such as low temperature impact resistance are unexpectedly improved.

SUMMARY

In a first embodiment, the invention is a polyolefin elastomeric composition, the composition consisting essentially of:
(a) a propylene-based elastomer having at least seventy five weight percent (75 wt %) units derived from propylene and from ten to twenty five weight percent (10-25 wt %) units derived from a C2, or a C4-C10 alpha olefin, the propylene-based elastomer exhibiting:
  (1) a heat of fusion by DSC analysis of from 1 Joules/gram to 35 Joules/gram;
  (2) a weight average molecular (Mw) of from 54000 to 875000 g/mol; and
  (3) a permanent set of less than 40%; and
(b) a homogeneous ethylene-alpha olefin interpolymer selected from a substantially linear polyethylene and a homogeneously branched linear polyethylene having a molecular weight distribution (Mw/Mn) of less than 3.5, a density from 0.885 to 0.915 g/ml, and a heat of fusion of from 65 to 125 Joules/gram, wherein the weight ratio of the propylene-based elastomer to the homogeneous ethylene-alpha olefin interpolymer is from 97:3 to 80:20, and wherein the composition exhibits a heat of fusion from 2 to 55 Joules/gram, and a 2% secant flexural modulus of less than 69 MPa.

In a second embodiment, the invention is a polyolefin elastomeric composition, the composition consisting essentially of:
(a) a propylene-based elastomer having at least seventy five weight percent (75 wt %) units derived from propylene and from eleven to seventeen weight percent (11-17 wt %) units derived from ethylene, the propylene-based elastomer exhibiting:
  (1) a heat of fusion by DSC analysis of from 2 Joules/gram to 15 Joules/gram;
  (2) a molecular weight distribution (Mw/Mn) of less than 3.5;
  (3) a melt flow rate of from 2 to 30 g/10 minutes; and
  (3) substantially isotactic propylene sequences; and
(b) a homogeneous ethylene-alpha olefin interpolymer selected from a substantially linear polyethylene and a homogeneously branched linear polyethylene comprising from 91 to 97 mole percent units derived from ethylene and 3 to 9 mole percent units derived from an alpha olefin having from 4 to 12 carbon atoms and having a density of from 0.890 to 0.910 g/ml, a molecular weight distribution (Mw/Mn) of less than 3.5, an index of refraction from 1.503 to 1.509, and a heat of fusion of from 75 to 115 Joules/gram, wherein the weight ratio of the propylene-based elastomer to the homogeneous ethylene-alpha olefin interpolymer is from 97:3 to 80:20,
and wherein the composition has a molecular weight distribution (Mw/Mn) of between 1.7 and 10 and exhibits a heat of fusion from 2 to 55 Joules/gram, a peak crystallization temperature of at least 20° C., and a 2% secant flexural modulus of less than 67 MPa.

In a third embodiment, the invention is a polyolefin elastomeric composition, the composition consisting essentially of:
(a) a propylene-based elastomer having at least seventy five weight percent (75 wt %) units derived from propylene and from twelve to sixteen weight percent (12-16 wt %) units derived from ethylene, the propylene-based elastomer exhibiting:
  (1) a heat of fusion by DSC analysis of from 2 Joules/gram to 12 Joules/gram;

(2) a molecular weight distribution (Mw/Mn) of less than 3.5;

(3) a melt flow rate of from 2 to 30 g/10 minutes; and (3) substantially isotactic propylene sequences; and (b) a homogeneous ethylene-alpha olefin interpolymer selected from a substantially linear polyethylene and a homogeneously branched linear polyethylene comprising from 91 to 97 mole percent units derived from ethylene and 3 to 9 mole percent units derived from an alpha olefin having from 4 to 8 carbon atoms and having a density of from 0.895 to 0.905 g/ml, a molecular weight distribution (Mw/Mn) of less than 3.0, an index of refraction from 1.505 to 1.507, and a heat of fusion of from 89 to 101 Joules/gram, wherein the weight ratio of the propylene-based elastomer to the homogeneous ethylene-alpha olefin interpolymer is from 90:10 to 84:16, and wherein the composition has a molecular weight distribution (Mw/Mn) of between 2.0 and 5.0, exhibits a heat of fusion from 2 to 50 Joules/gram, a peak crystallization temperature of at least 40° C., and a 2% secant flexural modulus of less than 30 MPa.

The term "consisting essentially of" indicates that in addition to specified elements, materials, or steps; elements, materials or steps that do not material affect the basic and novel characteristics of the subject invention are optionally also present. For example, additives which are commonly used with propylene-based polymers at levels known to one of skill in the art, preferably no more than two percent by weight, can be optionally added within the scope of the invention. For example, the polyolefin elastomeric composition may include organic and inorganic fillers, antioxidants (such as, for example, hindered phenols or phosphites), light stabilizers (such as, for example, hindered amines), antiblock and slip agents, plasticizers (such as, for example, dioctylphthalate or epoxidized soy bean oil), processing aids (such as, for example, oils, stearic acid or a metal salt thereof), and colorants or pigments to the extent that they do not interfere with desired physical properties of the composition of the present invention.

In fourth embodiment of the invention, the polyolefin elastomeric compositions as described above may be blended with another ethylene-based or propylene-based polymer (such as a homopolymer polypropylene, a polypropylene copolymer or impact modified polypropylene).

The propylene-based elastomers preferably are manufactured with a metallocene catalyst, a non-metallocene, metal centered, heteroaryl ligand catalyst, a non-metallocene, metal centered, substituted aryl catalyst, or a mixture thereof. Preferably, the catalyst utilized is a non-metallocene, metal centered, heteroaryl ligand catalyst or a non-metallocene, metal centered, substituted aryl catalyst which can both be described by the following general formula, optionally with an activating cocatalyst:

$$MLn$$

wherein:

M is a metal selected from Groups 3 to 6 and the lanthanoids (elements 57 to 71) as designated by the IUPAC Periodic Table (version 03 October 2005);

L is a ligand bonded to the transition metal through at least one atom that is C, O, N, P, F, Cl, Br, I, or S, and L is not a pi-bonded charge-delocalized substituted or unsubstituted cyclopentadienyl ligand, and at least one of L is a substituted aryl or heteroaryl ligand;

and n is an integer.

Where broad crystallinity distribution propylene-based elastomers are desired, the use of a non-metallocene, metal centered, heteroaryl ligand catalyst is most preferably utilized to manufacture the elastomer.

Non-metallocene, metal centered, heteroaryl ligand catalysts and the non-metallocene, metal centered, substituted aryl ligand catalysts are further described below.

FIGURES

Figure 5:
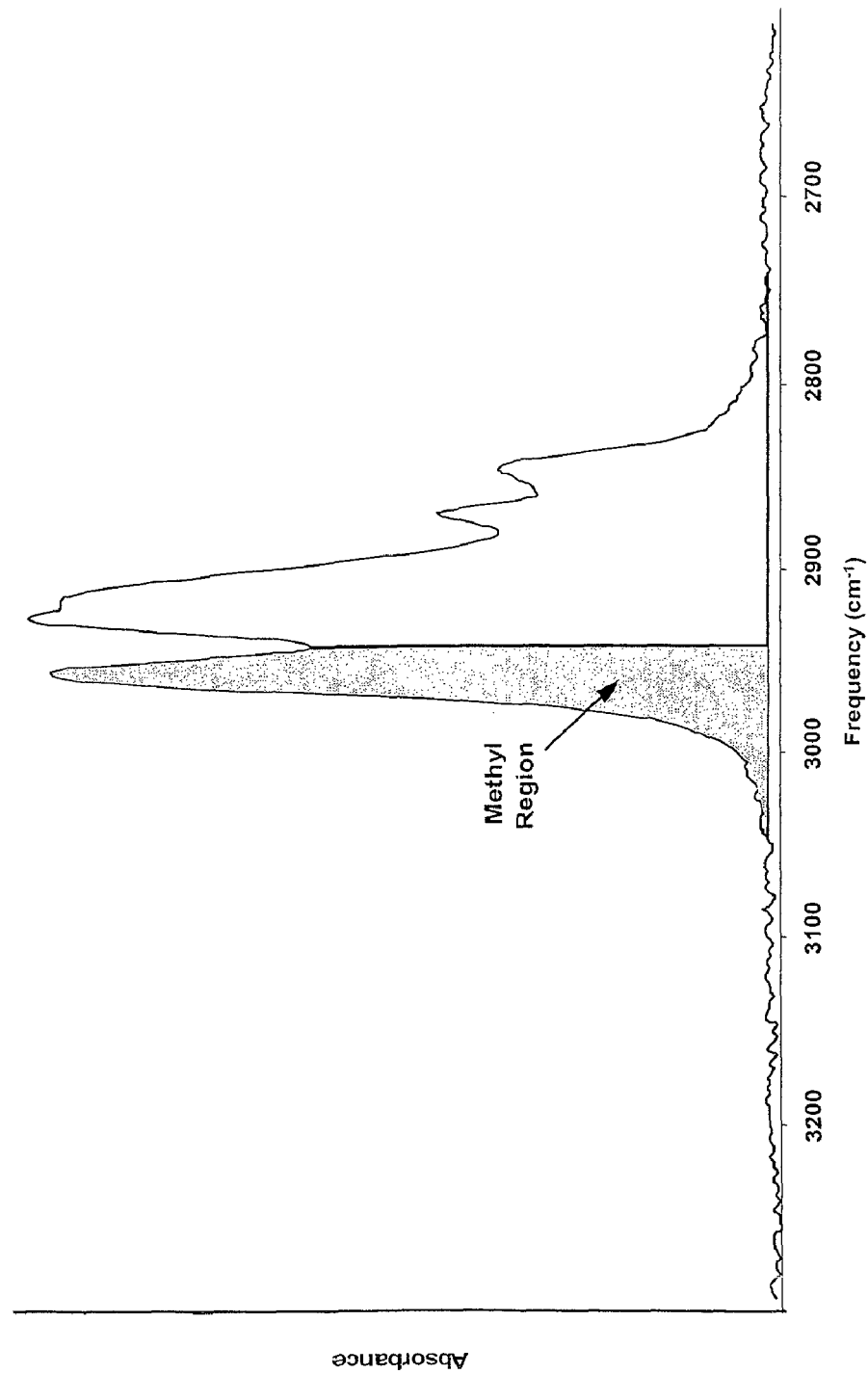

FIG. 5 shows an example infrared spectrum for a propylene-ethylene copolymer. The spectrum is from a GPC-FTIR system and shows the carbon-hydrogen stretching regions. The absorbances at frequencies greater than 2940 $cm^{-1}$ are calculated as a fraction of the total absorbance from 2750 $cm^{-1}$ to 3050 $cm^{-1}$ and used to calculate the weight fraction of propylene.

Figure 6:
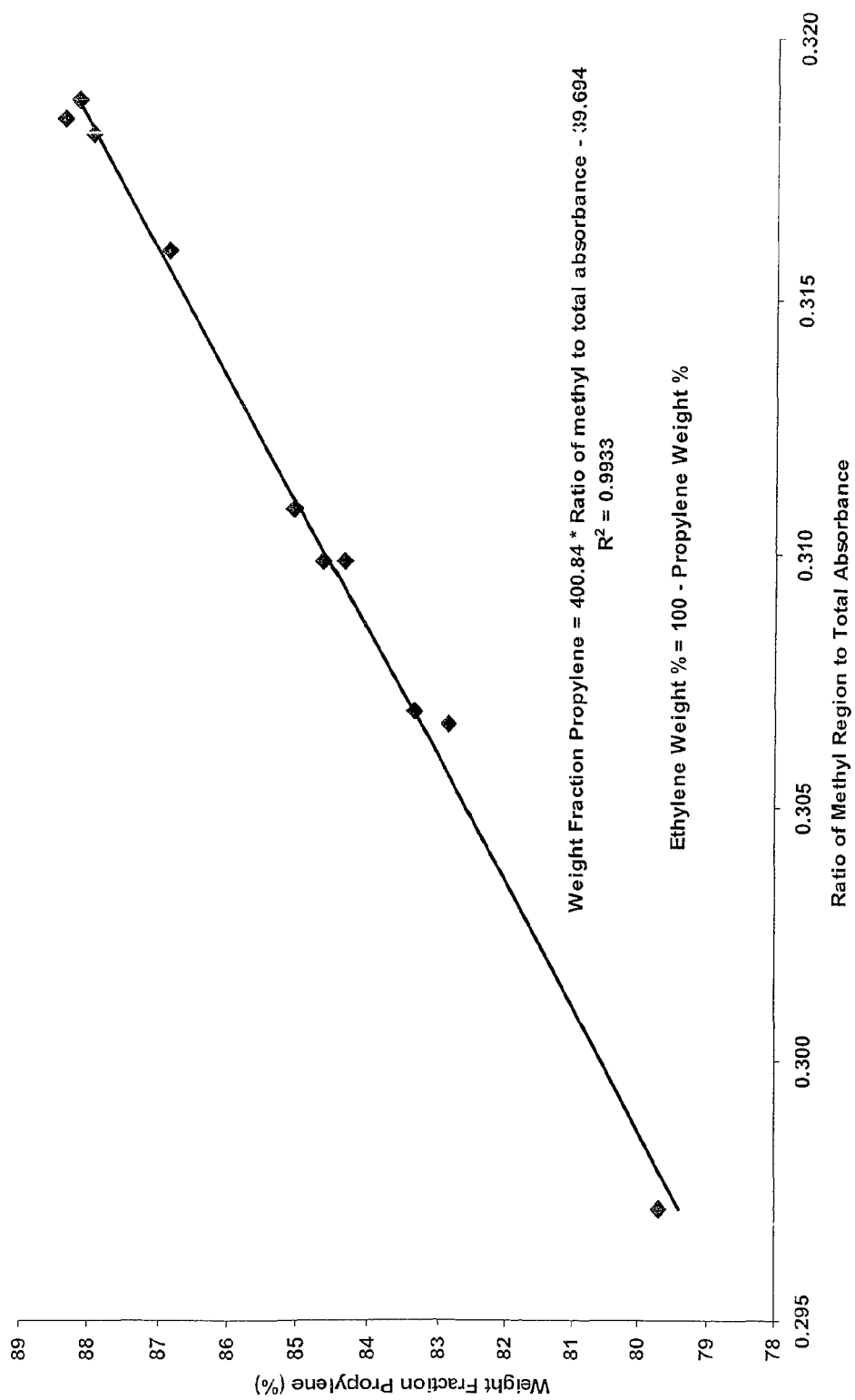

FIG. 6 shows the calibration used to calculate the propylene weight fraction using the total area and a partial area from the absorbances at frequencies greater than 2940 $cm^{-1}$ in an infrared spectrum such as in FIG. 5.

Figure 7:
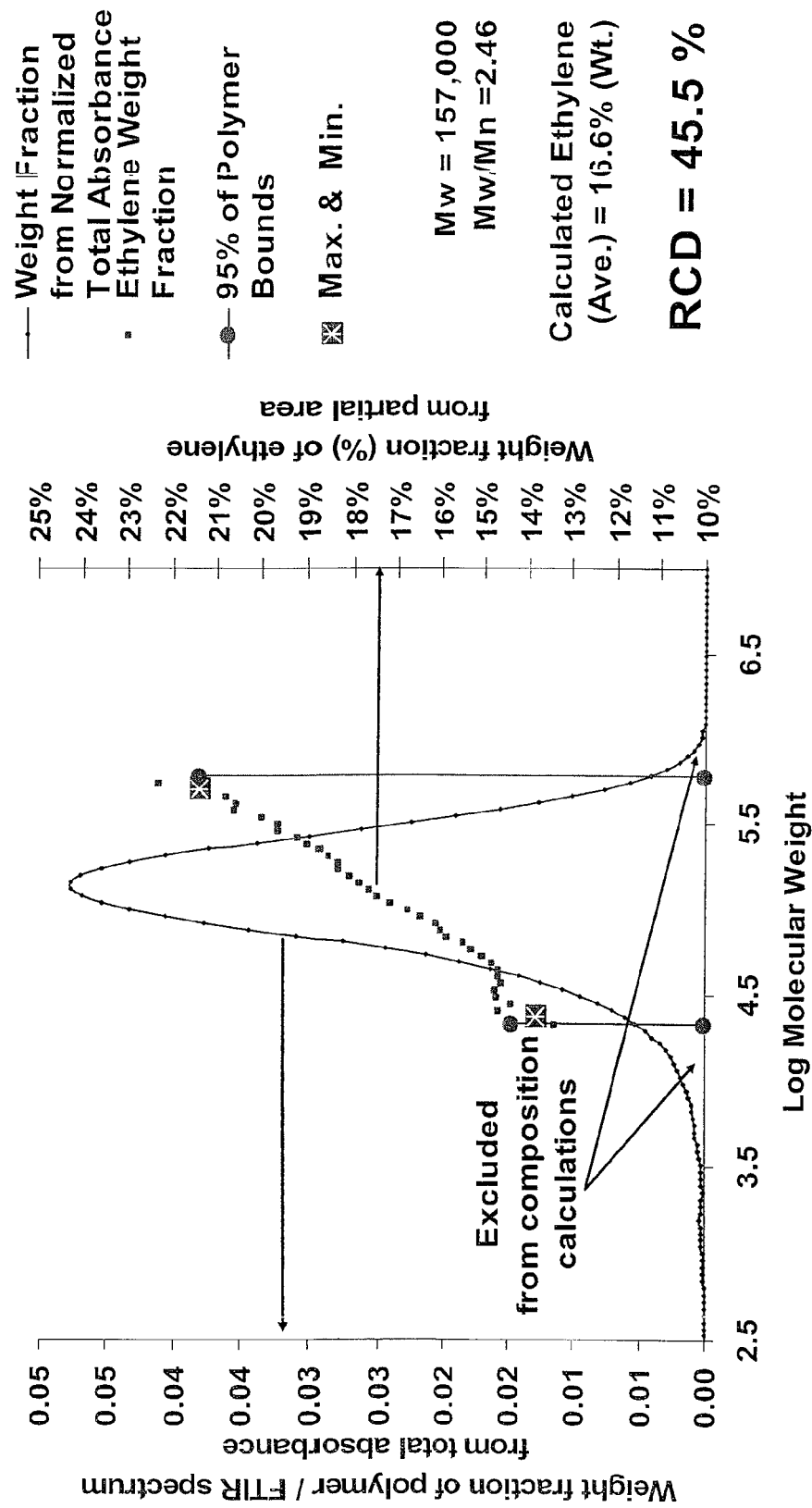

FIG. 7 shows the composition distribution by GPC-FTIR for P/E-1. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

Figure 8:
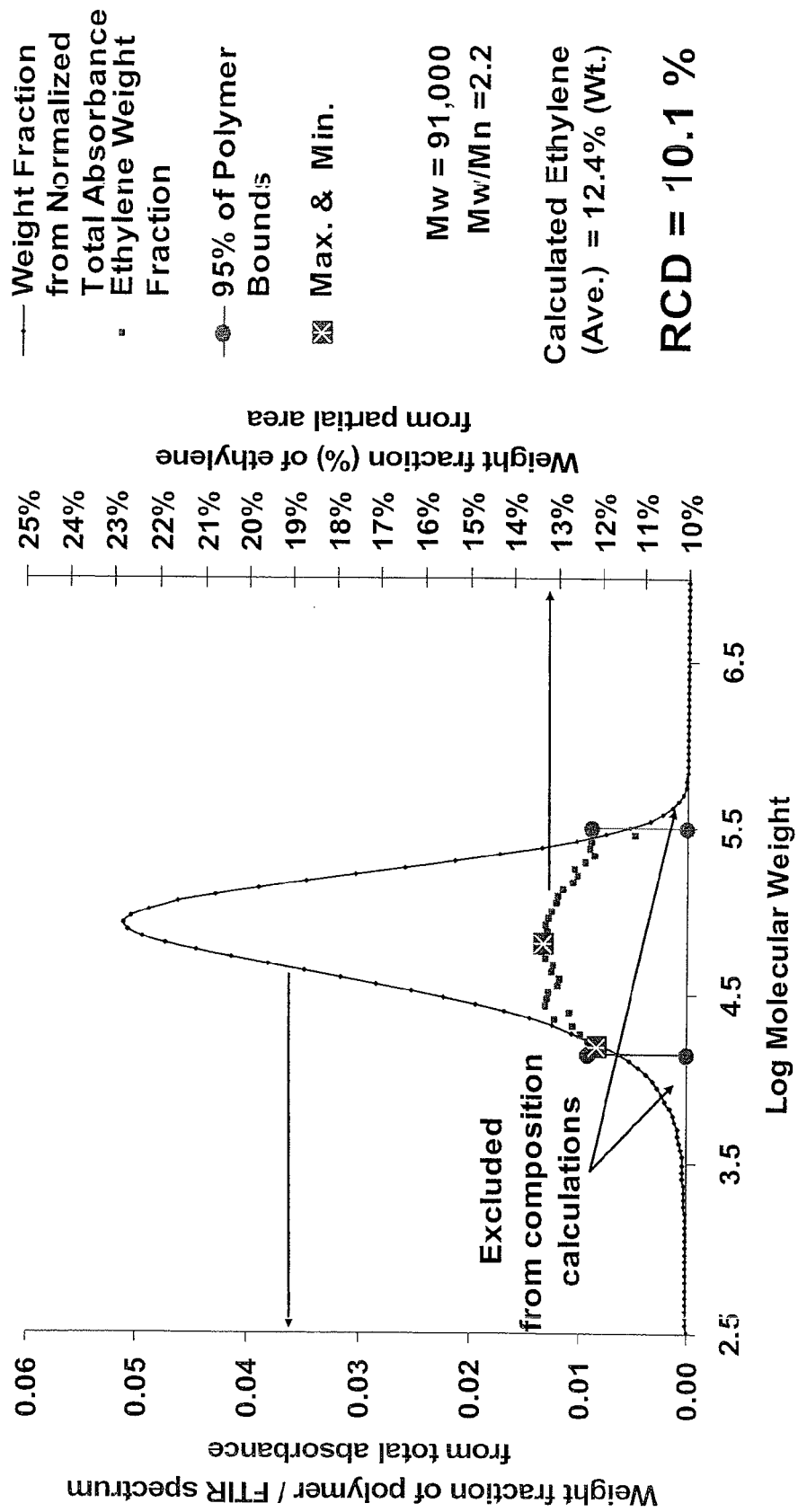

FIG. 8 shows the composition distribution by GPC-FTIR for a metallocene catalyzed propylene-ethylene copolymer. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

DETAILED DESCRIPTION

Homogeneous Ethylene-Alpha Olefin Interpolymer:

The homogeneous ethylene-alpha olefin interpolymer used in the blend preferably is an interpolymer of units derived from ethylene and a C4-C20 alpha-olefin comonomer. The preferred alpha-olefin comonomers are C4 to C12 alpha-olefins, more preferably C4-C8 alpha-olefins and 4-methyl-1-pentene, further more preferably C4, C6 and C8 alpha-olefins, and most preferably 1-octene. The homogeneous ethylene-alpha olefin interpolymer comprises from 91 to 97 mole percent units derived from ethylene with the remainder comprising an alpha olefin. The homogeneous ethylene-alpha olefin interpolymers are selected from substantially linear polyethylene polymers and homogeneous branched linear polyethylene (both as more fully described below). The homogeneous ethylene-alpha olefin interpolymers can be made using manufacturing processes known to one of ordinary skill in the art, such as gas phase, solution, or slurry polymer manufacturing processes. Examples of homogeneous ethylene-alpha olefin interpolymers useful in the invention are ethylene/1-octene substantially linear polyethylene available from The Dow Chemical Company under the trademark "AFFINITY" and "ENGAGE", homogeneous branched linear polyethylene available from ExxonMobil Chemical and DEXPlastomers (DSM/ExxonMobil Chemical) under the trademarks "EXACT" and "EXCEED" and ethylene-alpha-olefin interpolymers available from Innovene (subsidiary of BP Group under the trademark "INNOVEX", ethylene-alpha olefin copolymers available from Basell under the trademarks "LUPOLEX" and "LUFLEXEN", and ethylene-alpha olefin copolymers available from Mitsui Chemicals under the trademarks "TAFMER".

A polyethylene is any polymer comprising greater than seventy mole percent —$CH_2CH_2$— repeating units derived from an ethylene monomer. Interpolymers include copolymers, terpolymers, tetrapolymers and higher order polymers of ethylene and C4 to C20 olefins.

"Substantially linear polyethylene" is polyethylene as described in U.S. Pat. Nos. 5,272,236 and 5,278,272.

"Homogeneously branched linear polyethylenes" are polyethylenes having a CDBI greater than 50% as calculated in accordance with WO1993004486(A1) using the equipment and procedures as described in U.S. Pat. No. 5,008,204, such as polyethylenes available from the Exxon Chemical Company under the trademark "EXCEED" and "EXACT".

The melt index ("MI") of the homogeneous ethylene-alpha olefin interpolymer is from 0.1 to 1500 g/10 min, more preferably from 0.3 to 20 g/10 min, further more preferably from 0.5 to 15 g/10 min, most preferably from 1 to 10 g/10 min. Melt index (MI) measurement is performed according to ASTM D-1238, Condition 190° C./2.16 kilogram (kg) weight, formerly known as "Condition E" and also known as MI or $I_2$. Melt index is inversely proportional to the molecular weight of the polymer. Thus, higher molecular weight correlates with lower melt index, although the relationship is not linear. It is known for one of ordinary skill in the art that the favored melt index can vary depending on the end-use applications for which the composition is utilized. For example, if the composition is to be useful for blown film applications, the preferred melt index of the ethylene-alpha olefin interpolymer preferably is from 0.1 to 3 grams/10 minutes; for cast film applications, the melt index preferably is 2 to 25 grams/10 minutes; for spunbond nonwoven and/or staple fiber applications, the melt index preferably is 5 to 25 grams/10 minutes; for extrusion coating, the melt index preferably is 2 to 20 grams/10 minutes; for melt blown nonwoven applications the melt index preferably is 10 to 600 grams/10 minutes; for hot melt adhesive applications, the melt index preferably is 10 to 1000 grams/10 minutes; for injection molding applications, the melt index preferably is 1 to 200 grams/10 minutes. (Note: Resins with MI greater than about MI of 500 may be correlated with Brookfield Viscosity at 350° F. (177° C.) as described in Table One of U.S. Pat. No. 6,054,544. For example a polyethylene with a MI of 1000 g/10 min has a Brookfield Viscosity of about 8200 cps. A polyethylene with a 500 MI g/10 min has a Brookfield Viscosity of about 17000 cps.)

The density of the homogeneous ethylene-alpha olefin interpolymers are from 0.885 to 0.915 g/mL, preferably from 0.890 to 0.910 g/mL, more preferably from 0.895 to 0.905 g/mL, and most preferably from 0.897 to 0.903 g/mL (measured on compression molded samples at 190° C. according to ASTM D4703-00 and cooled using procedure B) using the procedure of ASTM D792 to determine the density. The homogeneous ethylene-alpha olefin interpolymers preferably have a crystallinity of from 27 to 42 percent by weight. For ethylene 1-octene interpolymers, this crystallinity corresponds to from 14 to 25 percent by weight polymeric units derived from 1-octene. For ethylene 1-hexene interpolymers, this crystallinity corresponds to from 12 to 20 percent by weight polymeric units derived from 1-hexene. For ethylene 1-butene interpolymers, this crystallinity corresponds to from 8.5 to 18.3 percent by weight polymeric units derived from 1-butene. The crystallinity can be determined from the heat of fusion by using the relationship that polyethylene having 100 weight percent crystallinity has a heat of fusion of 290 J/g. With this relationship, the total crystallinity of an ethylene-alpha olefin interpolymer (units: weight% crystallinity) is calculated as the heat of fusion divided by 290 J/g and multiplied 100.

The homogeneous ethylene-alpha olefin interpolymers exhibit a heat of fusion of from 65 to 125 Joules/gram, preferably from 75 to 115 Joules/gram, more preferably from 80 to 105 Joules/gram, and most preferably from 89 to 101 Joules/gram.

The homogeneous ethylene-alpha olefin interpolymers exhibit a peak crystallization temperature of 64° C. to 94° C., preferably from 69° C. to 90° C., more preferably from 75° C. to 83° C., and most preferably from 76° C. to 82° C. The homogeneous ethylene-alpha olefin interpolymers exhibit a peak melting temperature of 78° C. to 110° C., preferably from 84° C. to 105° C., more preferably from 90° C. to 101° C., and most preferably from 92° C. to 99° C.

The homogeneous ethylene-alpha olefin interpolymer exhibits a flexural modulus (2% secant, by ASTM D790) for compression molded samples using the previously described condition of about 27 to 131 MPa; preferably about 35 to 101 MPa; more preferably about 45 to 78 MPa and most preferably about 51 to 70 MPa.

The resins requirements reflect the need for the homogeneous ethylene-alpha olefin to nucleate the propylene-based elastomer which facilitates crystallization of the propylene-based polymer.

Preferably, the homogeneous ethylene-alpha olefin interpolymer has an in index of refraction measured by ASTM D542-00 of 1.496 to 1.516, more preferably from 1.503 to 1.509, and most preferably from 1.505 to 1.507. While not wanting to be limited by theory, it is believed that limiting the index of refraction of the ethylene-alpha olefin interpolymer to these ranges will be particularly beneficial for improving the optical properties if the inventive composition is blended with a polypropylene.

The homogeneous ethylene-alpha olefin interpolymers are present at a level of at least 3 weight percent of the composition, based on the weight of the blend of propylene-based elastomer and homogeneous ethylene-alpha olefin interpolymer present, more preferred at least 5 weight percent; and less than 20 weight percent, preferably less than 15 weight percent based on the overall propylene-based elastomer/homogeneous ethylene-alpha olefin interpolymer blend. The homogeneous ethylene-alpha olefin interpolymer preferably is present at from 3 weight percent to 10 weight percent of the composition (preferably from 4 weight percent to 8 weight percent) when a blend with improved optics is desirable and/or when the propylene-based elastomer exhibits a relatively high heat of fusion (i.e. between about 20 and 35 J/gram). The homogeneous ethylene-alpha olefin interpolymer preferably is present at from 10 weight percent to 15 weight percent of the composition when the propylene-based elastomer exhibits a relatively lower heat of fusion (i.e. between about 1 to 16 J/gram).

While not wanting be limited by theory, it is believed that a minimum of at least 3 wt. % homogeneous ethylene-alpha olefin interpolymer is thought to be required to induce sufficient crystallization of propylene-crystallinity in the propylene-based elastomer to reduce the stickiness of the composition sufficiently to meet the various handling needs from composition manufacturing (i.e. pelletizing) to the fabrication of end-use articles. The maximum amount of homogeneous ethylene-alpha olefin interpolymer to be utilized is limited by the flexibility and elastic behavior, and for some end-use applications, is limited by the optical properties of the blend.

It is believed that some applications may favor similar rheological behavior of the formulation components for the particular strain rates observed during conversion. Methods in particular which may prefer this rheological behavior include fiber spinning, film extrusion, and injection molding. For these applications, similar rheological behavior can be measured in shear, extension, or others modes as appropriate for the particular conversion method.

A method suitable for measurement of shear rheology can be described as follows. A TA Instruments Ares LS Model (New Castle, Del., USA) dynamic mechanical spectrometer with 25 mm diameter parallel plates is used to determine the dynamic rheological data. A frequency sweep with five logarithmically spaced points per decade is run from 0.1 to 100 radians per second (rad/s) at $T_{expt}$ such that $T_{expt}$ is the temperature specific to the conversion method and the processing condition. The strain is determined to be within the linear viscoelastic regime by performing a strain sweep at 0.1 rad/s and $T_{expt}$ ° C., by strain sweep from 2 to 30 percent strain in 2 percent steps to determine the minimum required strain to produce torques within the specification of the transducer; another strain sweep at 100 rad/s and $T_{expt}$ ° C. is used to determine the maximum strain before nonlinearity occurs according to the procedure disclosed by J. M. Dealy and K. F. Wissbrun, "Melt Rheology and Its Role in Plastics Processing", Van Nostrand, New York (1990). All testing is performed in a nitrogen purge to minimize oxidative degradation. For similar rheological behavior, the ratio of viscosity from the highest viscosity polymer component to the lowest viscosity polymer component is typically 5 to 1, preferably 4 to 1, more preferably 2 to 1, and most preferably 1 at the strain rate for the particular application. If the strain rate of the application is beyond the measurable range of the instrument, the ratio of viscosity from the highest viscosity polymer component to the lowest viscosity polymer component can be taken to be 5 to 1, preferably 4 to 1, more preferably 2 to 1, and most preferably 1 at a shear rate of 100 rad/s.

Propylene-Based Elastomer:

The propylene-based elastomer comprises at least 75 percent by weight units derived from propylene (preferably at least 82 percent by weight, more preferably at least 83 percent by weight, further more preferably at least 84 percent by weight); and from 10 to 25 percent by weight units derived from an alpha olefin selected from ethylene and C4 to C20 alpha-olefins (preferably, from 10 to 18 percent by weight, more preferably from 11 to 17 percent by weight, and most preferably from 12 to 16 percent by weight) of the propylene-alpha olefin copolymer. Preferably, the alpha olefin comprises C2, and C4 to C10 alpha-olefins, more preferably C2, C4, C6 and C8 alpha-olefins, further more preferably ethylene and 1-butene, and most preferably ethylene.

The propylene-based elastomer is elastic (as described below), has a molecular weight distribution (Mw/Mn) of less than 3.5 (preferably less than 3.0), and exhibits a heat of fusion ($\Delta H$) by Differential Scanning calorimetry of from 1 to 35 Joules per gram, preferably from 2 to 25 Joules per gram, more preferably from 2 to 15 Joules per gram, further more preferably from 2 to 12 Joules per gram, and most preferably from 2 to 6 Joules/gram For samples which have a heat of fusion of less than 2 J/g for the method described elsewhere in this document, an additional DSC procedure is applied to determine the DSC properties: (1) hold samples at 210° C. for 3 minutes; (2) cool at 10° C./min until 23° C.; (3) remove from DSC and store sample at ambient conditions (23°±2° C. and 50±5% relative humidity) for 48 hours; (4) the sample is inserted into the DSC and cooled at a rate of 10° C./min to −40° C. and kept isothermally at that temperature for 3 minutes; (5) then, the sample is heated at a rate of 10° C./min until complete melting. Heat of fusion is determined from the thermogram from step (5) as described in PCT Patent Application No WO03040201. For this procedure, the heat of fusion is preferably 2 to 12 Joules/gram, and most preferably from 2 to 6 Joules/gram.

The weight-averaged molecular weight (Mw) of the propylene-based elastomer is from at least from about 54000 to 875000 g/mol, preferably from about 69000 to 440000 g/mol, more preferably from about 111000 to 390000 g/mol, and most preferably from about 165000 to 360000 g/mol.

For purposes of this invention, a polymer or polymer composition is considered to exhibit "elastic" behavior (i.e. is an "elastomer") if the polymer or polymer composition conforms to the following description. ASTM D1708 microtensile samples are cut from a compression molded plaque (see subsequent description). Using an Instron Model 5564 (Instron Corporation, Norwood, Mass.) fitted with pneumatic grips and a 100 N load cell, the sample is deformed to 100% strain at 500%/min (111.25 mm/min) from an initial gauge length of 22.25 mm at 23°+2° C. and 50+5% relative humidity. The grips are returned to the original position and then immediately extended until the onset of a positive tensile stress (0.05 MPa) is measured. The strain corresponding to this point is defined to be the permanent set. Samples which exhibit a permanent set of less than or equal to 40% strain are defined as elastic. The following is an exemplary calculation for P/E-1 of the examples.

Initial Length ($L_o$): 22.25 mm
Length at 100% strain during $1^{st}$ cycle, extension: 44.5 mm
Length at Tensile Stress during $2^{nd}$ cycle at 0.05 MPa (L'): 24.92 mm $$\text{Permanent Set} = \frac{L' - L_0}{L_0} \times 100\% = \frac{24.92 \text{ mm} - 22.25 \text{ mm}}{22.25 \text{ mm}} \times 100\% = 12\%$$

Since a permanent set of 12% is less than 40% strain, this material qualifies as "elastic" (i.e. is an "elastomer"). Preferably, the propylene-based elastomers exhibit a permanent set of less than 30%, more preferably less than 20%, and most preferably less than 15%.

Exemplary propylene-based elastomers useful in the invention include propylene-alpha olefin copolymers made using metallocene catalysts in the solution process, such as propylene-ethylene copolymers available from Exxon-Mobil Corporation under the VISTAMAXX trademark and propylene-butene copolymers available from Mitsui Chemicals under the TAFMER trademark and also include propylene-alpha olefins copolymers manufactured using a nonmetallocene, metal centered, heteroaryl ligand catalyst, such as described in WO2003040201 A1. An example of a nonmetallocene, metal centered, heteroaryl ligand catalyst is Catalyst A, described below. In a particular preferred aspect of the invention, a propylene-ethylene copolymer made with a non-metallocene heteroaryl ligand catalyst, and exhibiting the properties described herein is utilized.

Another example of a nonmetallocene, metal centered, ligand catalyst that may be utilized to manufacture a propylene-based elastomer useful in the invention are the catalysts described in U.S. Pat. Nos. 6,897,276; 6,869,904; and 6,841,502 to Boussie et al., which are incorporated by reference in their entirety for their teachings regarding such catalysts. These catalysts are referred to herein as non-metallocene, metal centered, substituted aryl ligand catalysts.

The propylene-based elastomer of the invention typically has a melt flow rate (according to ASTM D-1238, 2.16 kg, 210° C.) of from at least 0.1 to 1150 g/10 min, preferably 1 to 500 g/10 min, more preferably 1.5 to 100 g/10 min, and most preferably 2 to 30 g/10 min. For applications requiring very low viscosity, such as melt blown nonwoven applications and adhesive applications, the melt flow rate typically is not measured and instead the propylene-based elastomers have a molecular weight by GPC as set forth earlier and measured as set forth below.

For the propylene-based elastomers melt flow rate (MFR) measurement is performed according to ASTM D-1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear. The melt flow rate of the propylene-alpha olefin to be utilized is dependent on the end-use application it is desirably utilized in. For example, for air-quenched blown films, the melt flow rate is typically from 0.1 to 10 g/10 min; for cast film, the melt flow rate is typically from 2 to 20 g/10 min; for spun-bound non-woven applications, the melt flow rate is typically from 12 to 60 g/10 min; for melt-blown non-woven applications, the melt flow rate is typically from about 100 to about 1150 g/10 min. Resins with MFR greater than about 100 g/10 min can be spun. Resins with less than about 100 MFR can be used in spunbond processes with the addition of chain scission agents such as peroxides, free radical initiators, or agents during the process such as described in US20030216494A1.

The melt flow rate is typically from about 0.3 to about 500 g/10 min for injection molding application, the melt flow rate is typically from about 2 to about 100 g/10 min; for thermoforming end-use application, the melt flow rate is typically from about 0.2 to about 5 g/10 min; for profile extrusion applications, the melt flow rate is typically from about 0.3 to about 10 g/10 min; for blow molding applications, the melt flow rate is typically from about 0.2 to about 5 g/10 min; for sheet extrusion applications, the melt flow rate is typically from about 0.3 to about 10 g/10 min; for biaxially oriented film, the melt flow rate is typically from about 2 to about 8 g/10 min.

The propylene-based elastomer exhibits a flexural modulus (measured as 2% secant according to ASTM D790) for compression molded samples using the previously described condition of about 1 to 69 MPa, preferably about 2 to 25.3 MPa, more preferably about 3 to 15.5 MPa, and most preferably about 4 to 10 MPa.

The copolymers of this invention typically have substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well known in the art, and are described in, for example, U.S. Pat. No. 5,504,172 and WO 00/01745 that refer to the isotactic sequence in terms of a triad unit in the copolymer molecular chain determined by $^{13}$C NMR spectra. NMR spectra are determined as follows.

$^{13}$C NMR spectroscopy is one of a number of techniques known in the art for measuring comonomer incorporation into a polymer. An example of this technique is described for the determination of comonomer content for ethylene/a-olefin copolymers in Randall (*Journal of Macromolecular Science, Reviews in Macromolecular Chemistry and Physics*, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotropically labeled comonomer. The mole % comonomer can be determined by the ratio of the integrals corresponding to the number of moles of comonomer to the integrals corresponding to the number of moles of all of the monomers in the interpolymer, as described in Randall, for example.

The data are collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^{1}$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described above) the mr region is corrected for ethylene and regio-error by subtracting the contribution from PPQ and PPE. For these propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means which are known in the art.

For copolymers made using a nonmetallocene, metal-centered, heteroaryl ligand catalyst, such as described in U.S. Patent Publication NO. 2003/0204017, the $^{13}$C NMR peaks corresponding to a regio-error at about 14.6 and about 15.7 ppm are believed to be the result of stereoselective 2,1-insertion errors of propylene units into the growing polymer chain. In general, for a given comonomer content, higher levels of regio-errors lead to a lowering of the melting point and the modulus of the polymer, while lower levels lead to a higher melting point and a higher modulus of the polymer.

For propylene/ethylene copolymers the following procedure can be used to determine the comonomer composition and sequence distribution. Integral areas are determined from the $^{13}$C NMR spectrum and input into the matrix calculation to determine the mole fraction of each triad sequence. The matrix assignment is then used with the integrals to yield the mole fraction of each triad. The matrix calculation is a linear least squares implementation of Randall's (*Journal of Macromolecular Chemistry and Physics, Reviews in Macromolecular Chemistry and Physics*, C29 (2&3), 201-317, 1989) method modified to include the additional peaks and sequences for the 2,1 regio-error. Table B shows the integral regions and triad designations used in the assignment matrix. The numbers associated with each carbon indicate in which region of the spectrum it will resonate.

Mathematically the Matrix Method is a vector equation s=fM where M is an assignment matrix, s is a spectrum row vector, and f is a mole fraction composition vector. Successful implementation of the Matrix Method requires that M,f, and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the E/P copolymer are EEE, EEP, PEE, PEP, PPP, PPE, EPP, and EPE. For a polymer chain of reasonably high molecular weight ($\geq$10,000 g/mol), the $^{13}$C NMR experiment cannot distinguish EEP from PEE or PPE from EPP. Since all Markovian E/P copolymers have the mole fraction of PEE and EPP equal to each other, the equality restriction was chosen for the implementation as well. The same treatment was carried out for PPE and EPP. The above two equality restrictions reduce the eight triads into six independent variables. For clarity reason, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad which is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is overdetermined. The greater this difference is the more the system is overdetermined. The more overdetermined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also lets one input restrictions or constraints explicitly.

TABLE B

The Contribution of Each Carbon on the Central Unit of Each Triad Towards Different Integral Regions

| Triad name | Structure | Region for 1 | Region for 2 | Region for 3 |
|---|---|---|---|---|
| PPP | (structure with CH$_3$ groups and carbons 1, 2, 3) | L | A | O |

TABLE B-continued
The Contribution of Each Carbon on the Central Unit
of Each Triad Towards Different Integral Regions
| Triad name | Structure | Region for 1 | Region for 2 | Region for 3 |
|---|---|---|---|---|
| PPE | 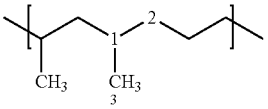 | J | C | O |
| EPP | 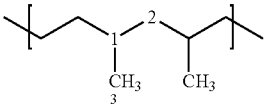 | J | A | O |
| EPE | 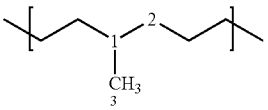 | H | C | O |
| EEEE | 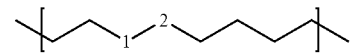 | K | K | |
| EEEP | 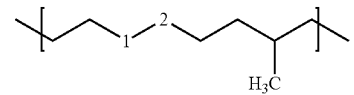 | K | J | |
| EEP | 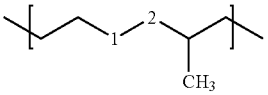 | M | C | |
| PEE | 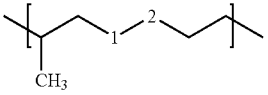 | M | J | |
| PEP | 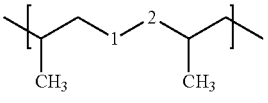 | N | C | |
| PQE | 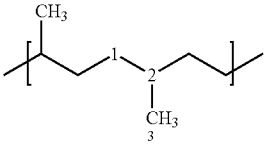 | F | G | O |
| QEP | 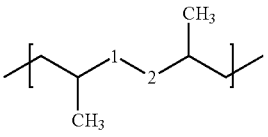 | F | F | |
| XPPQE | 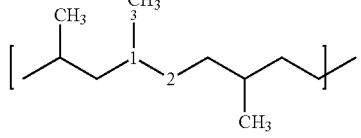 | J | F | O |
| XPPQP | 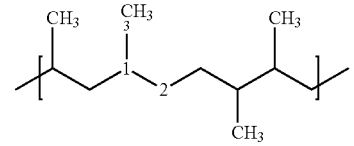 | J | E | O |

TABLE B-continued

The Contribution of Each Carbon on the Central Unit
of Each Triad Towards Different Integral Regions

| Triad name | Structure | Region for 1 | Region for 2 | Region for 3 |
|---|---|---|---|---|
| PPQPX | (structure with CH$_3$ groups, positions 1, 2, and CH$_3$ at position 3) | I | D | Q |
| PQPPX | (structure with CH$_3$ groups at position 3, positions 1, 2, and CH$_3$) | F | B | P |

Chemical Shift Ranges

| A | B | C | D | E | F | G | H | I |
|---|---|---|---|---|---|---|---|---|
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1,2 inserted propylene composition is calculated by summing all of the stereoregular propylene centered triad sequence mole fractions. 2,1 inserted propylene composition (Q) is calculated by summing all of the Q centered triad sequence mole fractions. The mole percent of propylene is determined by adding up all of the P centered triads and multiplying the mole fraction by 100. Ethylene composition is determined by subtracting the P and Q mole percentage values from 100.

Example 2

Metallocene Catalyzed:
This example demonstrates the calculation for propylene-ethylene copolymer made using a metallocene catalyst synthesized according to Example 15 of U.S. Pat. No. 5,616,664, using both a conventional interpretation of Koenig J. L. (Spectroscopy of Polymers American Chemical Society, Washington, D.C., 1992) and the matrix method, as described above. The propylene-ethylene copolymer is manufactured according to Example 1 of US Patent Application 2003/0204017. The propylene-ethylene copolymer is analyzed as follows. The data is collected using a Varian UNITY Plus 400 MHz NMR spectrometer corresponding to a $^{13}C$ resonance Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

In a particularly preferred aspect of the invention, the propylene-based elastomer utilized in the invention comprises a propylene-ethylene copolymer made using a nonmetallocene, metal-centered, heteroaryl ligand catalyst as described in U.S. patent application Ser. No. 10/139,786 filed May 5, 2002 (WO 03/040201), which is incorporated by reference herein in its entirety for its teachings regarding such catalysts. For such catalysts, the term "heteroaryl" includes substituted heteroaryl. An example of such a nonmetallocene, metal-centered, heteroaryl ligand catalyst is Catalyst A described in the Examples, below. The propylene-based elastomers made with such nonmetallocene, metal-centered, heteroaryl ligand catalyst exhibit a unique regio-error. The regio-error is identified by $^{13}C$ NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity, and they typically represent about 0.02 to about 7 mole percent of the propylene insertions into the copolymer chain.

Figure 1:
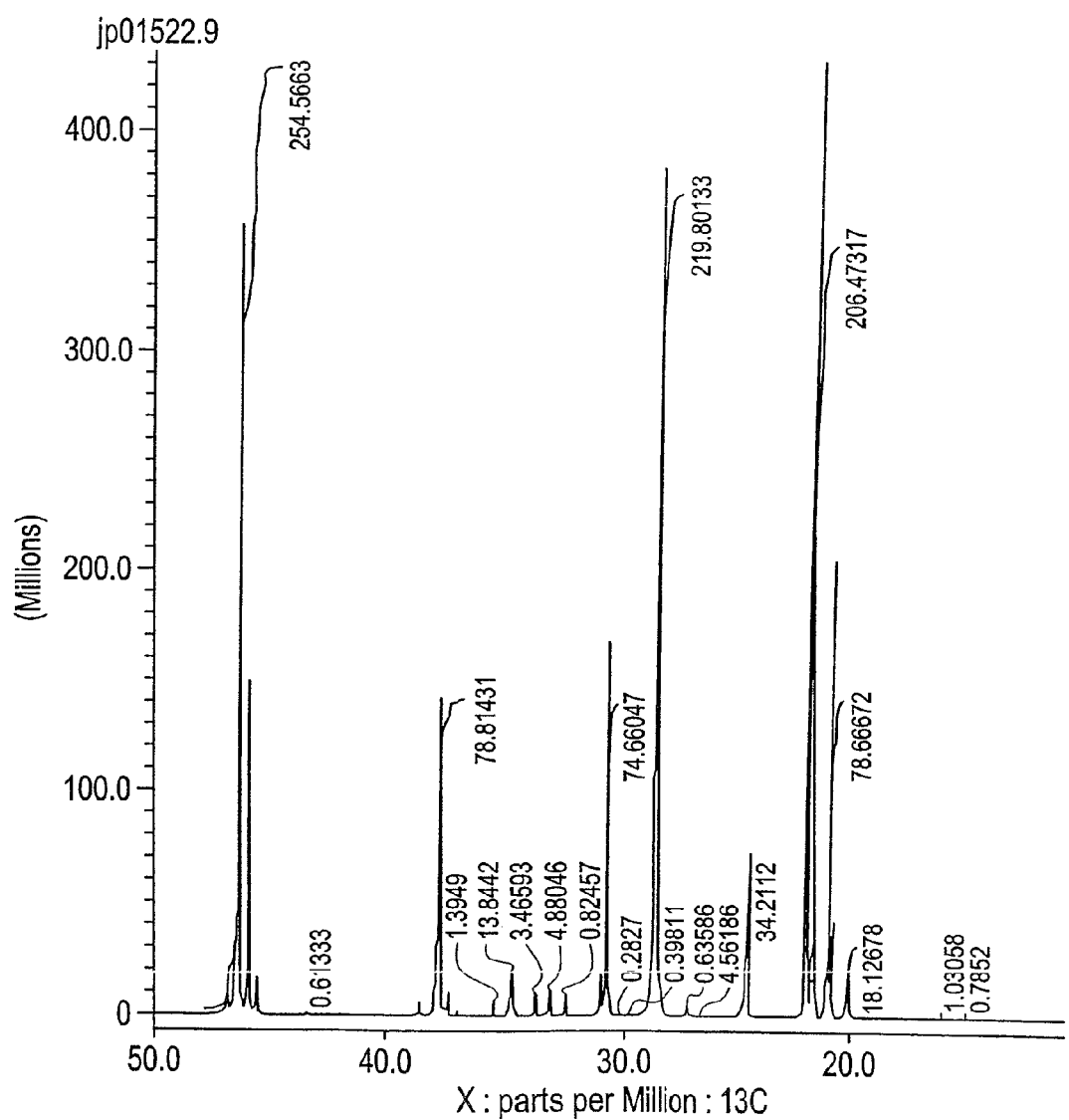
FIG. 1 shows the $^{13}$C NMR Spectrum of a propylene-ethylene copolymer (made with an activated non-metallocene, metal centered, heteroaryl ligand catalyst similar to Catalyst A), which is similar to (but lower ethylene content than) the propylene-based elastomer described in the Examples.
Figure 2:
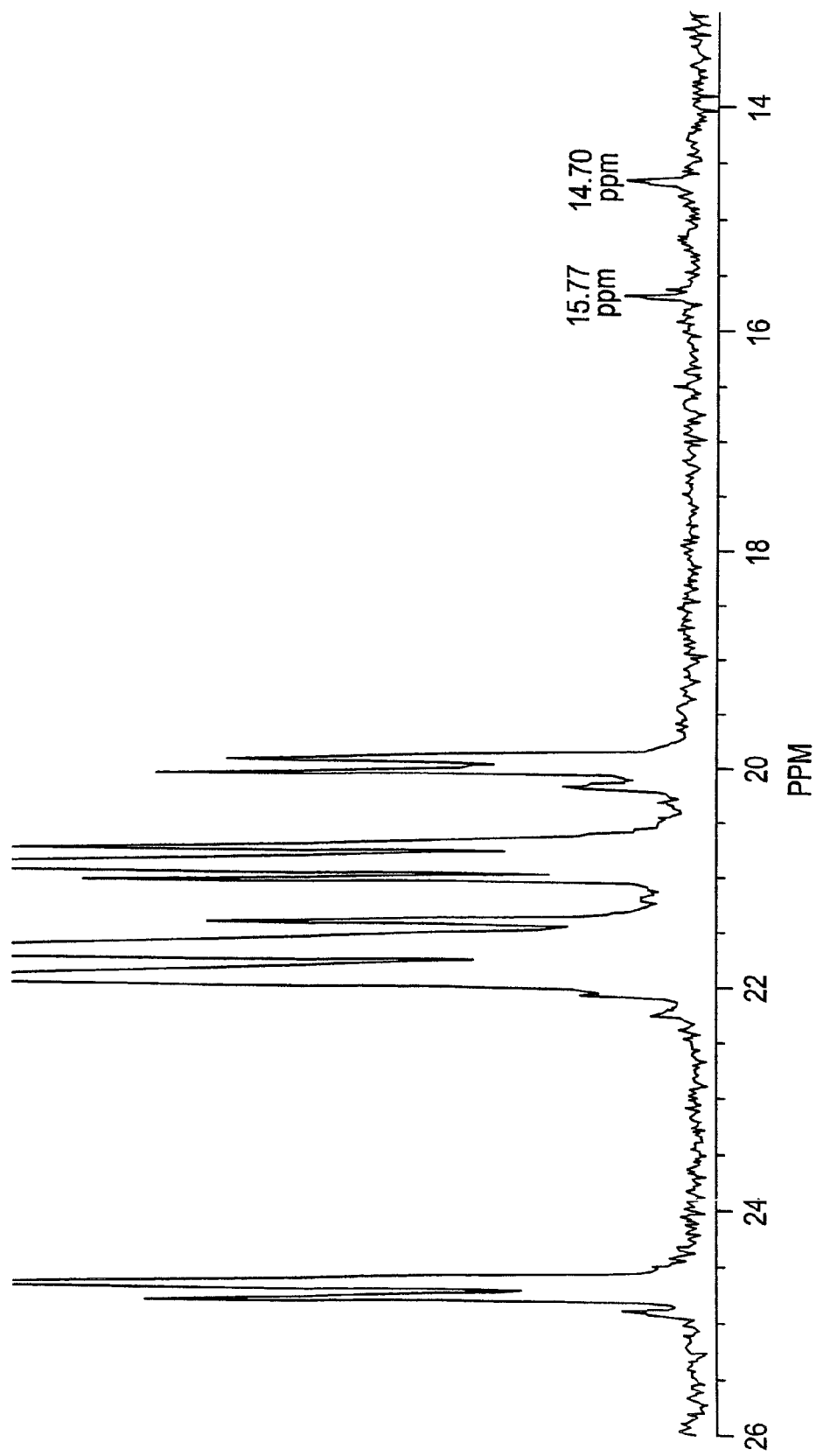
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
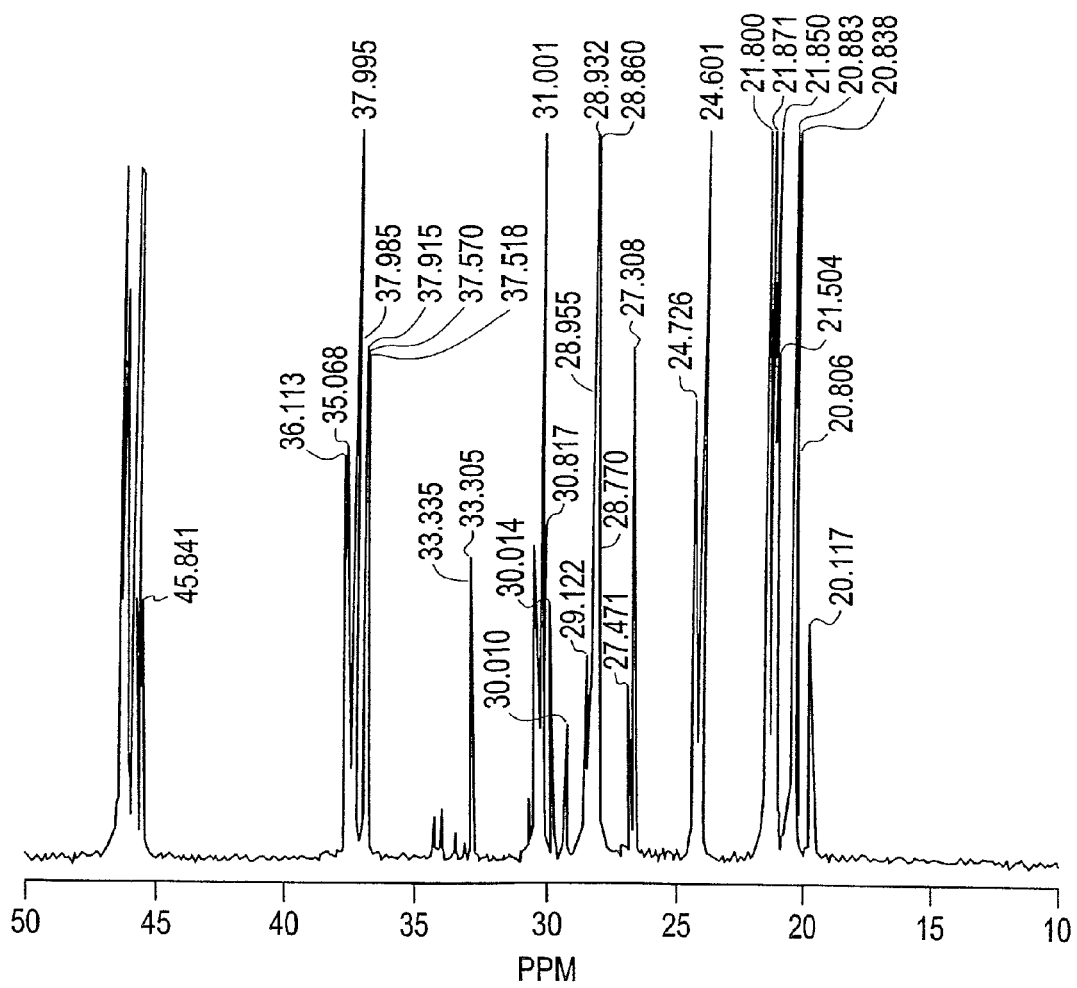
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}C$ NMR spectra further illustrates the unique regio-errors of propylene-ethylene copolymer elastomers utilized in the particularly preferred aspect of the invention. FIGS. 1 and 2 are the spectra of the propylene-ethylene copolymers similar to the propylene-based elastomers utilized in the Examples, except they have a lower ethylene content than the elastomers of the examples. The spectrum of each polymer reports a high degree of isotacticity (isotactic triad (mm) measured by $^{13}C$ NMR of greater than 0.94) and the unique regio-errors of these propylene-ethylene based copolymers. The $^{13}C$ NMR spectrum of FIG. 3 is that of a propylene-ethylene copolymer prepared using a metallocene catalyst. This spectrum does not report the regio-error (around 15 ppm) characteristic of the most preferred propylene-ethylene copolymers used in this invention.

Preferably, the propylene-based elastomers have a molecular weight distribution (MWD), defined as weight average molecular weight divided by number average molecular weight (Mw/Mn) of 3.5 or less, preferably 3.0 or less.

Molecular weight and molecular weight distributions of the propylene based polymers are determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$$\{N\} = KM^a$$

where $K_{pp} = 1.90E-04$, $a_{pp} = 0.725$ and $K_{ps} = 1.26E-04$, $a_{ps} = 0.702$.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). In the particularly preferred aspect of the invention, propylene-based elastomers (preferably propylene-ethylene elastomers) are utilized in the invention and are characterized by a DSC curve with a $T_{me}$ that remains essentially the same and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step. Differential Scanning calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The propylene-based elastomers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in US Patent Application No (WO03040201). The factor that is used to convert heat of fusion into nominal weight % crystallinity is 165 J/g=100 weight % crystallinity. With this conversion factor, the total crystallinity of a propylene-based copolymer (units: weight % crystallinity) is calculated as the heat of fusion divided by 165 J/g and multiplied by 100%.

Broad Crystallinity Distribution

In a particularly preferred aspect of the invention, the propylene-based elastomers exhibit broad crystallinity distribution. The inventors believe that the use of a propylene-based elastomer having a broad crystallinity distribution will result in compositions having lower stickiness/blocking characteristics as described more fully below. For elastomers having a heat of fusion greater than about 20 Joules/gram, the crystallinity distribution preferably is determined from TREF/ATREF analysis as described below.

The determination of crystallizable sequence length distribution can be accomplished on a preparative scale by temperature-rising elution fractionation (TREF). The relative mass of individual fractions can be used as a basis for estimating a more continuous distribution. L. Wild, et al., Journal of Polymer Science: Polymer. Physics Ed., 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of isotactic copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, Journal of Applied Polymer Science: Appl. Polym. Symp., 45, 25(1990).

TABLE C

| Parameters Used for TREF | |
|---|---|
| Parameter | Explanation |
| Column type and size | Stainless steel shot with 1.5 cc interstitial volume |
| Mass detector | Single beam infrared detector IR4 purchased from PolymerChar of Valencia, Spain |
| Injection temperature | 150° C. |
| Temperature control device | GC oven |
| Solvent | 1,2,4-trichlorobenzene |

TABLE C-continued

Parameters Used for TREF

| Parameter | Explanation |
| --- | --- |
| Flow Rate | 1.0 ml/min. |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature.

One statistical factor that can be used to describe the crystallinity distribution of a propylene-based elastomer is the skewness, which is a statistic that reflects the asymmetry of the TREF curve for a particular polymer. Equation 1 mathematically represents the skewness index, $S_{ix}$, as a measure of this asymmetry.

$$S_{ix} = \frac{\sqrt[3]{\sum w_i * (T_i - T_{Max})^3}}{\sqrt{\sum w_i * (T_i - T_{Max})^2}}. \quad \text{Equation 1}$$

The value, $T_{Max}$, is defined as the temperature of the largest weight fraction eluting between 50 and 90° C. in the TREF curve. $T_i$ and $w_i$ are the elution temperature and weight fraction respectively of an abitrary, $i^{th}$ fraction in the TREF distribution. The distributions have been normalized (the sum of the $w_i$ equals 100%) with respect to the total area of the curve eluting above 30° C. and less than 90° C. Thus, the index reflects only the shape of the crystallized polymer containing comonomer (ethylene) and any uncrystallized polymer (polymer still in solution at or below 30° C.) has been omitted from the calculation shown in Equation 1. In a particularly preferred aspect of the current invention have broad crystallinity distribution indicated by a skewness index for the propylene-based elastomer is greater than (−1.2), preferably greater than −1.0, more preferably greater than −0.8, and further more preferably greater than −0.7, and in some instances greater than −0.60. Such a skewness index is indicative of a propylene-based elastomer having a broad crystallinity distribution.

In addition to the skewness index, another measure of the breadth of the TREF curve (and therefore a measure of the breadth of the crystallinity distribution of a copolymer is the Median Elution Temperature of the final eluting quartile ($T_{M4}$). The Median Elution Temperature is the median elution temperature of the 25% weight fraction of the TREF distribution (the polymer still in solution at or below 30° C. is excluded from the calculation as discussed above for skewness index) that elutes last or at the highest temperatures. The Upper Temperature Quartile Range ($T_{M4}$-$T_{Max}$) defines the difference between the Median Elution Temperature of the final eluting quartile and the peak temperature $T_{Max}$. In this particularly preferred aspect of the invention, the propylene-alpha olefin copolymers have broad crystallinity distributions indicated in part by an Upper Temperature Quartile Range of greater than 4.0° C., preferably at least 4.5° C., more preferably at least 5° C., further more preferably at least 6° C., most preferably at least 7° C., and in some instances, at least 8° C. and even at least 9° C. In general, higher values for the Upper Temperature Quartile Range correspond to broader crystallinity distributions for the copolymer. The Propylene-based elastomers utilized in the invention preferably exhibit broad crystallinity distribution fulfilling the above-described Upper Temperature Quartile Range.

Further, in this particularly preferred aspect, propylene-based elastomers comprise propylene-ethylene copolymers and show unusual and unexpected results when examined by TREF. The distributions tend to cover a large elution temperature range while at the same time giving a prominent, narrow peak. In addition, over a wide range of ethylene incorporation, the peak temperature, $T_{Max}$, is near 60° C. to 65° C. In conventional propylene-based copolymers, for similar levels of ethylene incorporation, this peak moves to higher elution temperatures with lower ethylene incorporation.

For conventional metallocene catalysts the approximate relationship of the mole fraction of propylene, $X_p$, to the TREF elution temperature for the peak maximum, $T_{Max}$, is given by the following equation:

$$\text{Log}_e(X_p) = -289/(273+T_{max}) + 0.74$$

For the propylene-based elastomers in this particularly preferred aspect, the natural log of the mole fraction of propylene, LnP, is greater than that of the conventional metallocenes, as shown in this equation:

$$LnP > -289/(273+T_{max}) + 0.75$$

For propylene-based elastomers exhibiting a heat of fusion of less than 20 Joules/gram heat of fusion, broad crystallinity distribution preferably is indicated by either the determination of the high crystalline fraction (HCF) using DSC or by the determination of the relative composition drift (RCD) using GPC-FTIR. These analyses are performed as follows:

The High Crystalline Fraction, HCF, is defined as the partial area in the DSC melting curve above 128° C. The partial area is obtained by first obtaining the heat of fusion, then dropping a perpendicular at 128° C. and obtaining the partial area above 128° C. (relative to the same baseline as was used for the heat of fusion). The propylene-ethylene copolymers of the most preferred aspect of the current invention have a heat of fusion of less than 20 Joules/gram and have a HCF fraction of greater than about 0.1 J/g and an ethylene content of greater than about 10% by weight, more preferably the HCF will be greater than 0.2 J/g, and most preferably the HCF will be greater than about 0.5 J/g and an ethylene content of greater than about 10% by weight.

Figure 4:
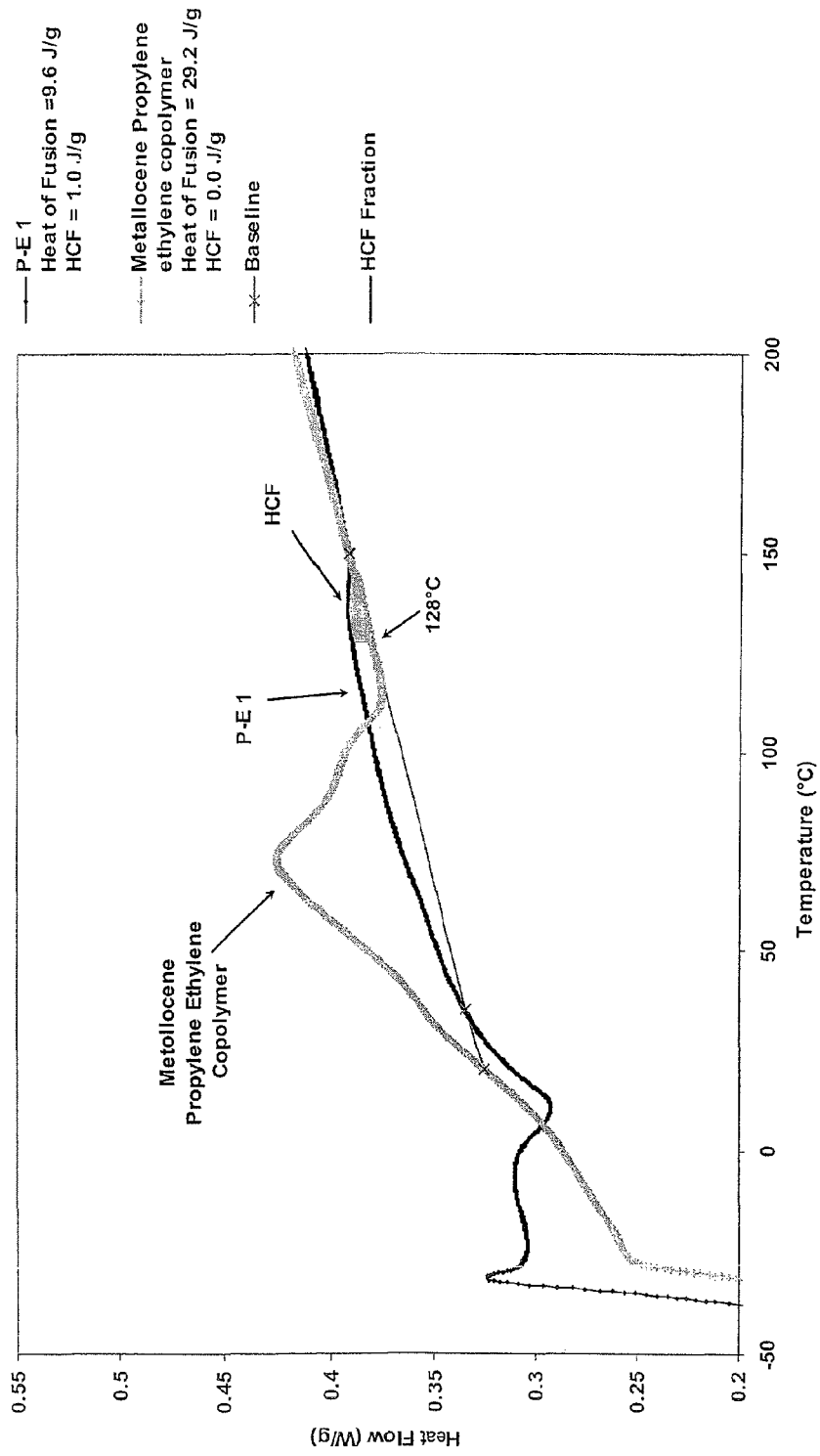
FIG. 4 Shows a comparison of broad and narrow crystallinity distributions by DSC for P/E-1 and a propylene-ethylene copolymer manufactured with a metallocene catalyst. The figure also shows the high crystalline fraction (HCF) partial area relative to the area representing the heat of fusion.

FIG. 4 shows a comparison of broad and narrow crystallinity distributions by DSC for P-E-1 and a metallocene catalyzed propylene ethylene copolymer having about 13.7 weight percent units derived from ethylene. The figure also shows the high crystalline fraction (HCF) partial area relative to the area representing the heat of fusion.

As an alternative or adjunct to the DSC method described above, the relative breadth of the crystallinity distribution for lower crystallinity copolymers can be established using GPC-FTIR methodologies [R. P. Markovich, L. G. Hazlitt, L. Smith, *ACS Symposium Series: Chromatography of Polymers*, v. 521, pp. 270-276, 199; R. P. Markovich, L. G. Hazlitt, L. Smith, *Polymeric Materials Science and Engineering*, 65, 98-100, 1991; P. J. DesLauriers, D. C. Rohlfing, E. T. Hsieh, "Quantifying Short Chain Branching in Ethylene 1-olefin Copolymers using Size Exclusion Chromatography and Fourier Transform Infrared Spectroscopy (SEC-FTIR)", *Poly-* mer, 43 (2002), 159-170]. These methods, originally intended for ethylene based copolymers, can be readily adapted to the propylene based systems to provide copolymer composition as a function of polymer molecular weight. The propylene-ethylene copolymers exhibiting broad composition (with respect to ethylene incorporation) distributions, when measured as described in the following GPC-FTIR method, have also been found to exhibit broad crystallinity distributions as indicated by high HCF values in the above described DSC method. For this reason, for the purposes of the current invention, composition distribution and crystallinity distribution shall be regarded as congruent, in that the relative breadth of the crystallinity distribution as indicated by the magnitude of the HCF value for a low overall crystallinity copolymer (i.e. heat of fusion less than 20 Joules/gram) corresponds to a broader composition distribution as indicated by the magnitude of RCD (to be described below) measured by GPC-FTIR.

The various specifications and parameters for the GPC-FTIR analysis are given in Tables D and E. Sequential spectra are obtained from the GPC-FTIR system while dissolved copolymer fractions elute from the GPC column (in order of decreasing molecular weight) through an appropriately designed flow through cell [Part #0820-2000, Polymer Laboratories Inc., Amherst, Mass.]. An absorbance region from 2750 cm$^{-1}$ to 3050 cm$^{-1}$ within each FTIR spectrum is integrated as shown in FIG. 5 and recorded as a function of the spectrum number or elution volume and is used as a very good approximation of the mass (or concentration) at each spectrum number or elution volume in the GPC chromatogram. This integrated area is referred to as the total absorbance of the spectrum and is further normalized by dividing by the sum of all the other total area integrations for all the other spectra. This normalized total area is thus equal to the weight fraction of the total polymer represented by a given spectrum (at a specific elution volume). Therefore the weight fraction of eluted polymer is the Gaussian shaped curve in each of the FIGS. 7-8 which is derived from the normalized total areas of each spectrum. The propylene/ethylene composition in each set of sequential spectrum (or at each successive elution volume) is estimated using the partial area of the absorbances in the spectrum occurring at greater than 2940 cm$^{-1}$ as shown in FIG. 5 using a calibration curve (as for example in FIG. 6). The calibration is prepared by integrating the averaged eluted spectra for several copolymers whose composition was previously determined by NMR using the methods found herein. Thus the composition (ethylene weight fraction) can be determined for each spectrum and plotted as a function of spectrum number or elution volume. These distributions are depicted in FIG. 7-8.

Finally, the breadth of any particular GPC-FTIR composition distribution (and by the definition described above, the relative crystallinity distribution) can be estimated by comparing the maximum and minimum ethylene content (of the fractions) using only the spectra with the highest total absorbance (i.e the highest polymer concentration) that when summed give 95% (by weight) of the eluted polymer and ignoring the spectra with the lowest total absorbance (or the "wings" in the GPC curve as shown in FIG. 6). This is necessary to avoid problems arising from low signal to noise. The maximum and minimum values are chosen as the median value of the three highest and lowest calculated ethylene values, respectively, among the 95% (by weight) of spectra for which compositions are calculated. The difference between the maximum and the minimum ethylene composition divided by the averaged calculated whole polymer ethylene composition is defined as the relative compositional drift or RCD and is expressed as a percentage. If the eluting species having the highest ethylene content occur at a higher molecular weight (i.e. at earlier elution volumes) than the species having the lowest ethylene content, then the RCD value is positive, otherwise it is negative Propylene-based elastomers of a particularly preferred aspect of the invention exhibit a broad crystallinity distribution as defined by a RCD greater than about 15%, more preferably greater than 30%, and most preferably greater than 45%.

Molecular weights are calculated from the reported weight average molecular weight, Mw, and the reported number average molecular weight, Mn, for each polymer. These are obtained from analyses described elsewhere in this document. Each sequential spectrum number (or elution volume) can be converted to a molecular weight by solving the following simultaneous equations.

$$M_w = \sum_{s=0}^{N} w_s \cdot M_S \quad M_n = \left[\sum_{s=0}^{N} w_s / M_S\right]^{-1} \quad \text{Log\_M}_s = m \cdot S + b$$

In these equations, S is the spectrum number (which is analogous to the elution volume) for each of the N+1 (0≦S≦N) sequential FTIR spectra, $M_S$ is the molecular weight at the spectrum number, S, $w_S$ is the normalized total area for the spectrum, S, and m and b are the necessary coefficients to calculate the molecular weight at each spectrum, S. These equations are easily solvable using tools such as SOLVER* [Microsoft Corp., Redmond, Wash.], by, for example, minimizing the following function for a and b:

$$f(a, b) = \left[1 - \frac{Mw'}{M_w}\right]^2 + \left[1 - \frac{Mn'}{M_n}\right]^2 = \left[1 - \frac{Mw}{\sum_{s=0}^{N} w_s \cdot M_S}\right]^2 + \left[1 - Mn \cdot \sum_{s=0}^{N} w_s / M_S\right]^2$$

TABLE D

Summary of FTIR [Thermo Electron Corp., Waltham, MA] parameters

DATA COLLECTION INFORMATION

Number of sample scans: 32
Sampling interval: 9.32 sec
Resolution: 4.000
Levels of zero filling: 0
Number of scan points: 8480
Number of FFT points: 8192
Laser frequency: 15798.3 cm-1
Interferogram peak position: 4096
Apodization: Happ-Genzel
Number of background scans: 0
Background gain: 0.0

DATA DESCRIPTION

Number of points: 1738
X-axis: Wavenumbers (cm-1)
Y-axis: Single Beam
First X value: 649.9036
Last X value: 3999.7031
Data spacing: 1.928497

SPECTROMETER DESCRIPTION

Spectrometer: Magna System 560
Source: IR
Detector: MCT/A
Beamsplitter: KBr

TABLE D-continued

Summary of FTIR [Thermo Electron Corp., Waltham, MA] parameters

Sample spacing: 2.0000
Digitizer bits: 20
Mirror velocity: 3.1647
Aperture: 95.00
Sample gain: 1.0
High pass filter: 200.0000
Low pass filter: 20000.0000
DATA PROCESSING HISTORY Data collection type: GC/IR
Total collection time: 30.01
Final format: Single Beam
Resolution: 4.000
from 649.9036 to 3999.7031
SERIES DESCRIPTION Minimum value: 0.1553
Maximum value: 30.0080
Step size: 0.1555
Number of spectra: 193

TABLE E

Summary of Flow through cell [Polymer Laboratories Inc., Amherst, MA.] and GPC[Waters Corp., Milford, MA.] parameters Polymer Labs FTIR Interface (Part # 0820-2000) with liquid connections on top Cell Windows: Calcium fluoride
(Dead volume: 70 □l, Path length: 1 mm)
GPC Instrument: Waters150 C High Temperature GPC
Columns: 4 × 300 × 7.5 mm Polymer Labs 10□ Mixed B
Solvent: Perchloroethylene (Sigma-Aldrich HPLC grade)
Flow Rate: 1 ml/min.
Concentration: 2.5 mg/ml
Injection: 250□l
Temperatures: 110° C.

FIG. 5 shows an example infrared spectrum for a propylene-based elastomer, which is a propylene-ethylene copolymer. The spectrum is from a GPC-FTIR system and shows the carbon-hydrogen stretching regions. The absorbances at frequencies greater than 2940 cm$^{-1}$ are calculated as a fraction of the total absorbance from 2750 cm$^{-1}$ to 3050 cm$^{-1}$ and used to calculate the weight fraction of propylene.

FIG. 6 shows the calibration used to calculate the propylene weight fraction using the total area and a partial area from the absorbances at frequencies greater than 2940 cm$^{-1}$ in an infrared spectrum such as in FIG. 5.

FIG. 7 shows the composition distribution by GPC-FTIR for P/E-1. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

FIG. 8 shows the composition distribution by GPC-FTIR for a metallocene propylene ethylene copolymer having 13.7 percent by weight units derived from ethylene. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

The Composition

The composition consists essentially of a homogeneous ethylene-alpha olefin interpolymer and a propylene-based elastomer (both as more fully described, above). The composition may be made by physically mixing the components of the composition together. Alternately, the composition may be a so-called in-reactor blend composition, whereby the composition is made in a single reactor with more than one polymerization steps or in several reactors operated in serial (i.e. the product of one reactor is passed into the second reactor where the second product is made) or in parallel (i.e. each reactor makes a separate product which are combined downstream from the reactors). The composition preferably is made at the polymer manufacturing plant where the propylene-based elastomer is manufactured, with the components being brought together prior to pelletization of the composition.

The composition has a polydispersity (Mw/Mn) of from 1.7 to 10, preferably from 1.8 to 8, more preferably 1.8 to 7, further more preferably from 1.8 to 6, and most preferably from 2.0 to 5.0. The composition exhibits a heat of fusion from 2 to 55 J/g, preferably from 2 to 50 J/g, more preferably from 3 to 25 J/g, most preferably from 4 to 22 J/g.

The composition typically exhibits a peak crystallization temperature greater than the peak crystallization temperature exhibited by the propylene-based elastomer component of the composition alone. Preferably, the peak crystallization temperature of the composition is at least 9° C., more preferably at least 20° C., further more preferably at least 30° C., and most preferably at least 40° C. In some particularly preferred aspects of the invention, the peak crystallization temperature of the composition is at least 60° C. It is believed that such a peak crystallization temperature will minimize stickiness of the composition as it is transferred through the polymer manufacturing facility, transported, stored, and handled by the equipment in the end-use article fabrication facility.

The composition exhibits a 2% secant flexural modulus of less than 69 MPa, preferably less than 67 MPa, more preferably less than 40 MPa, even more preferably less than 30 MPa, and most preferably less than 25 MPa. The composition is elastic as set forth by the earlier definition.

The preferred bulk isothermal crystallization rates for the inventive composition (containing the ethylene-alpha olefin interpolymer and the propylene-based elastomer) are faster (greater than about 10%, more preferably greater than 15%, further more preferably greater than 20%) than the crystallization rates for the propylene-based elastomer alone. It is believed that the improved crystallization kinetics at least in-part contribute to the lower stickiness and/or blocking behavior of the composition compared to the propylene-based elastomer, especially during short time periods, such as the transport of the newly formed pellets through the manufacturing facility. The improved crystallization behavior also may be beneficial when fabricating articles that rely upon faster crystallization behavior, such as injection molded fabricated products.

Further, though not wanting to be limited by theory, the inventors believe that compositions incorporating propylene-based elastomers exhibiting a broad crystallinity distribution, as defined above, will benefit more from addition of a homogeneous ethylene-alpha olefin interpolymer than a propylene-based elastomer having a narrow crystallinity distribution, such as a propylene-based elastomer manufactured using a metallocene catalyst. It is thought that a propylene-based elastomer having a broad crystallinity distribution, when placed into a composition with a homogeneous ethylene-alpha olefin interpolymer, will possess greater thermodynamic driving force for phase separation of the lower crystalline propylene-based species from the higher crystalline propylene-based species. This is further aided by a propylene-based elastomer, such as P/E-1 of the examples, which has a higher crystalline fraction (HCF) having a lower molecular weight compared to the average molecular weight of the elastomer. This is indicated by the higher levels of incorporated propylene in the lower molecular weight region of the GPC-FTIR. As a result, the lower crystalline species will tend to associate with the homogeneous ethylene-alpha olefin interpolymer contained in the composition. It is further believed that due to thermodynamics, the higher crystallinity propylene-based species will tend to migrate to the surface, with the homogeneous ethylene-alpha olefin interpolymer (and the lower crystallinity propylene-based species) being situated below the below the surface of the article. This should result in less sticky articles and less blocking of the articles to one another when a broad crystallinity distribution propylene-based elastomer is utilized for the inventive composition, due to the reduced amount of low crystallinity propylene-based species located at the surface of the article (such as pellets, films, fibers, etc). Also, for narrow crystallinity distribution propylene-based elastomers, a higher weight percent of homogeneous ethylene-alpha olefin interpolymer may be necessary to sufficiently reduce the stickiness of pellets and other articles made from the composition.

When used in blends with polypropylene (such as homopolymer polypropylene, polypropylene copolymers, or impact-modified polypropylene), such as in a ternary blend, the preferred haze as measured using ASTM D1003 for a 40 mil (1 millimeter) thick injection molded plaque is less than 90, preferably less than 85, more preferably less than 70, even more preferably less than 55.

The injection molded plaque is formed using a Demag (Van Dorn Demag Corporation, Strongsville, Ohio) NC 100 ton injection molder fitted with a surface gated combination ASTM/ISO 8.4"×9.5" T-style MUD mold manufactured by Master Precision Mold, Inc. (Greenville, Mich.). The mold is equipped with a water chiller that is capable of cooling the mold to 70° F. (16° C.). A separate mold is used to make 1 mm thick (40 mil) plaques for measuring optical properties. This mold is not capable of cooling by an external chiller.

Typical molding conditions are specified in the table below. The temperature ranges corresponding to zone 1, zone 2, and zone 3 in the extruder and at the nozzle are shown; ranges for injection time, hold time, cooling time, and cycle type are described; typical shot size and cushion values in terms of polymer volume are also shown; and pressures present during injection, the back pressure, and the hold pressure values and ranges are as specified.

Injection-Molding Conditions

| PARAMETER | Setting |
| --- | --- |
| TEMPERATURES Screw | |
| Zone 1 (° F.) | 400-600 |
| Zone 2 (° F.) | 400-600 |
| Zone 3 (° F.) | 400-600 |
| Nozzle | 70-100 |

-continued

| PARAMETER | Setting |
| --- | --- |
| TIMES | |
| injection (s) | 1-20 |
| hold (s) | 25-110 |
| cooling (s) | 63-99 |
| cycle (s) | 10-20 |
| shot size (cm) | 2-8 |
| cushion (cm) | 2-10 |
| PRESSURES | |
| inj press (psi) | 500 |
| back press (psi) | 400-1000 |
| hold press (psi) | 500 |

End-Use Applications and Fabricated Articles:

The composition can beneficially be used in numerous fabrication processes to make advantaged articles. Some examples of these articles and processes are: (1) films, both cast and air and water quenched flown films: suitable cast film and air quenched blown film processes are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. Suitable coextrusion techniques and requirements are known to one of ordinary skill in the art; (2) Injection molding applications, such as described, for example, in Injection Molding Handbook, T. A. Osswald, T. Turng, P. Gramann, Hanser Gardner Publications, ISBN #1569903182, 2001; (3) thermoforming applications, such as described, for example, in Technology of Thermoforming, J. L. Throne Hanser Gardner Publications, ISBN #1569901988, 1996; (4) melt blown fiber and nonwoven fabric applications, such as are described in *The Nonwovens Handbook*, Association of Nonwovens Fabrics Industry, Cary N.C. and Principles of Nonwovens, INDA, Cary N.C. ; and (5) spunbond fibers and nonwoven fabrics, such as described in *Nonwoven Fabrics: Raw Materials, Manufacture, Applications, Characteristics, Testing Processes* W. Albrecht, H. Fuchs, W. Kittelmann, ISBN #3527304061 , Wiley-VCH, 2003.

EXAMPLES

The following resins are utilized in the examples:

PP-1 is a 3.2 gram/10 minute melt flow rate homopolymer polypropylene available from The Dow Chemical Company under the grade designation H105-03NA having a flexural modulus of 1600 MPa (by ISO178), 35% haze (by ASTM D1003), and 45° gloss (by ASTM D245).

E/O-1 is an ethylene-1 octene substantially linear polyethylene available from The Dow Chemical Company under the grade designation AFFINITY PL1280 having an ethylene content of 81 weight percent, an octene content of 19 weight percent, a 0.900 g/cc density, a 6 grams/10 minutes melt index, an I10/I2 of 8, a molecular weight distribution (Mw/Mn) of about 2.3 and exhibits a heat of fusion of 95 Joules/gram and a 2% secant flexural modulus of about 78 MPa according to (ASTM D790).

E/H-1 is an ethylene-1 hexene substantially linear polyethylene having an ethylene content of about 84 weight percent, a hexene content of 16 weight percent, a 0.903 g/cc density, a 4.8 grams/10 minutes melt index, a I10/I2 of 6, a molecular weight distribution (Mw/Mn) of about 2.12 and exhibits a heat of fusion of 105 Joules/gram.

E/B-1 is an ethylene-1 butene substantially linear polyethylene having an ethylene content of about 87 weight percent, an butene content of 13 weight percent, a 0.901 g/cc density, a 6.7 grams/10 minutes melt index, an I10/I2 of 7.9, a molecular weight distribution (Mw/Mn) of about 2.08 and exhibits a heat of fusion of 98 Joules/gram and a 2% secant flexural modulus of about 61 MPa according to (ASTM D790).

P/E-1 is a propylene-ethylene elastomer made using Catalyst A using a polymerization method similar to the polymerization procedure described below. P/E-1 has molecular weight distribution of 2.46, a melt flow rate of 11.9 g/10 min, a tacticity of at least 94% triads, an ethylene content of 15 weight percent, a density of 0.857 g/cc, a heat of fusion of 9.6 Joules/gram, exhibits a 2% secant flexural modulus of 10 MPa according to ASTM D790, exhibits a permanent set of less than 12% as determined by the procedure described previously, and has a broad crystallinity distribution indicated by an RCP of 45.5% and a HCF of 1.0 Joules/gram according to the procedures described above.

Catalyst A

Synthesis of Catalyst A

Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-$κN^1$,$κN^2$]dimethyl-

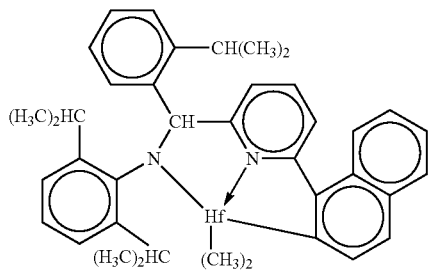

a) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109 g, 81.9 percent.

GC/MS 346 ($M^+$), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1 $H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° C.

$^1$H NMR ($CDCl_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$NMR ($CDCl_3$) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 ($M^+$), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobezene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

$^1$H NMR ($d_8$-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$C NMR ($d_8$-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthanlenyl).

The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N $NH_4Cl$ and the organic layer analyzed by high pressure liquid chromatography (HPLC) to check for complete consumption of starting material. The remainder of the reaction is quenched by the careful, slow addition of 1N $NH_4Cl$ (10 mL). The mixture is diluted with more ether and the organic layer washed twice with brine, dried ($Na_2SO_4$), filtered, and stripped of solvent under reduced pressure. The crude product obtained as a thick red oil (2.92 g; theoretical yield=2.87 g) is used without further purification.

$^1$H NMR ($CDCl_3$) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR ($CDCl_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25,131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-$κN^1$,$κN^2$]dimethyl- A glass jar is charged with 8.89 mmol of the ligand from step e) dissolved in 30 mL toluene. To this solution is added 8.98 mmol of n-BuLi (2.5 M solution in hexanes) by syringe.

This solution is stirred for 1 hour, then 8.89 mmol of solid HfCl$_4$ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the dry-box. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR (C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure
Propylene-Ethylene Copolymers are Made According to the Following Procedure. Catalyst A.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers are produced in a low-pressure, solution polymerization loop reactor, made up of a 3" loop pipe plus two heat exchanges, the total volume of which is 50.3 gallons. Solvent and monomer (propylene) are injected into the reactor as a liquid. The comonomer (ethylene) gas is fully dissolved in the liquid solvent. The feed is cooled to 10° C. before injection into the reactor. The reactor operates at polymer concentrations equal to 20 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification prior to mixing with the recycle stream (contains solvent, propylene, ethylene, and hydrogen). The recycle stream is passed through a bed of 75 wt % Molecular Sieve 13X and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (10° C.). The reactor operates at 525 psig and a control temperature equal to 105° C. The propylene conversion in the reactor is maintained by controlling the catalyst injection rate. The reaction temperature is maintained by controlling the temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned. Propylene-ethylene copolymers made according to the above described process may be utilized for the propylene alpha olefin copolymers of the invention.

TABLE I

Resins.

| Example | PP-1 | E/O-1 | E/H-1 | E/B-1 | P/E-1 |
|---|---|---|---|---|---|
| Description | homopolymer polypropylene | ethylene-octene copolymer | ethylene-hexene copolymer | ethylene-butene copolymer | propylene-ethylene copolymer |
| Ethylene (wt. %) | 0 | 81 | 84 | 87 | 18.6 |
| Propylene (wt. %) | 100 | 0 | 0 | 0 | 81.4 |
| Butene (wt. %) | 0 | 0 | 0 | 13 | 0 |
| Hexene (wt. %) | 0 | 0 | 16 | 0 | 0 |
| Octene (wt %) | 0 | 19 | 0 | 0 | 0 |
| Ethylene (mol. %) | 0 | 94.3 | 94 | 93.1 | 25.5 |
| Propylene (mol. %) | 100 | 0 | 0 | 0 | 74.5 |
| Butene (mol. %) | 0 | 0 | 0 | 6.9 | 0 |
| Hexene (mol. %) | 0 | 0 | 6 | 0 | 0 |
| Octene (mol. %) | 0 | 5.7 | 0 | 0 | 0 |
| Density (g/cm$^3$) | 0.9 | 0.9 | 0.903 | 0.901 | 0.857 |
| Mw (kg/mol) | — | 69.3 | 73.8 | 57.5 | 156.7 |
| Mn (kg/mol) | — | 31.5 | 34.8 | 27.7 | 63.6 |
| Mw/Mn | — | 2.2 | 2.12 | 2.08 | 2.46 |
| MFR or MI | 3.2$^a$ | 6$^b$ | 4.8$^b$ | 6.7$^b$ | 11.9$^a$ |

TABLE I-continued

Resins.

| Example | PP-1 | E/O-1 | E/H-1 | E/B-1 | P/E-1 |
|---|---|---|---|---|---|
| Sodium Benzoate (ppm) | 600 | 0 | 0 | 0 | 0 |
| Tc (° C.) | — | 80 | 79 | 73 | 0[c] |
| Tm (° C.) | 160 | 95 | 97 | 91 | n/a |
| ΔH (J/g) | 108 | 95 | 105 | 98 | 9.6 |
| Flexural Modulus (MPa) | 1600[d] | 96[e] | — | 61[e] | 9[e] |
| Permanent Set (%) | 88 | — | — | — | 12 |
| Haze - 20 mil (%) (ASTM D1003) | 57 ± 2 | — | — | — | — |

[a]ASTM D1238, 2.16 kg, 230° C. (MFR).
[b]ASTM D1238, 2.16 kg, 190° C. (MI).
[c]defined to be 0° C. due to absence of crystallization peak
[d]ISO 178
[e]ASTM D790, 2% secant
'n/a' denotes not applicable.
'—' denotes not measured.

TABLE II

Examples

| | Example | | | |
|---|---|---|---|---|
| | Ex 1 | Ex 3 | Ex 4 | CE 1 |
| Component A | P/E-1 | P/E-1 | P/E-1 | P/E-1 |
| Component B | E/O-1 | E/B-1 | E/H-1 | — |
| Component A (wt. %) | 95 | 95 | 95 | 100 |
| Component B (wt. %) | 5 | 5 | 5 | 0 |
| AO1 (wt. %) | 0.033 | 0.033 | 0.033 | 0 |
| AO2 (wt. %) | 0.066 | 0.066 | 0.033 | 0 |
| Mw (kg/mol) | 159.1 | — | — | 156.7 |
| Mn (kg/mol) | 65.9 | — | — | 63.6 |
| Mw/Mn | 2.41 | — | — | 2.46 |
| Tc (° C.) | 62.1 | — | — | 0[c] |
| ΔH (J/g) | 12 | 13 | 14 | 9.6 |
| Permanent Set (%) | 24 ± 1 | — | — | 12 |
| Haze - 20 mil (%) (ASTM D1003) | 59 ± 3 | — | — | 5 |
| 20° Gloss - 20 mil (%) (ASTM D245) | 37 ± 7 | — | — | — |

[c]defined to be 0° C. due to absence of crystallization peak
The prefix 'Ex' denotes an inventive example
The prefix 'CE' denotes a comparative example
AO1 is additional pentaerythritol tetrakis(3-(3,5-di-tert-butyl-4-hydroxyphenyl)propionate) (Irganox 1010) added when fabricating the example.
AO2 is additional tris(2,4-ditert-butylphenyl)phosphite (Irgafos 168) added when fabricating the example.
'—' denotes not measured.

TABLE III

Ternary Blends.

| | EXAMPLE # | | |
|---|---|---|---|
| | Ex 2 | CE 2 | CE 3 |
| PP-1 (wt. %) | 89.4 | 89.9 | 89.9 |
| Elastomer | Ex 1 | CE 1 | CE 1 |
| Elastomer (wt. %) | 10.5 | 10.0 | 10.0 |
| Izod D-B transition Temp (° C.) | 7 ± 3 | 9 ± 3 | 9 ± 3 |
| Room temperature (23° C.) notched Izod (ft · lb/in) | 10.0 ± 0.1 | 9.5 ± 0.3 | 9.5 ± 0.2 |
| 10° C. notched Izod (ft · lb/in) | 6.3 ± 0.2 | 5.2 ± 0.4 | 5.1 ± 0.3 |
| 5° C. notched Izod (ft · lb/in) | 3 ± 1 | 1.4 ± 0.3 | 1.2 |
| Flex Mod, 1% Secant (kpsi) | 176 ± 4 | 180 ± 5 | 174 ± 5 |
| MFR (g/10 min) | 4.1[a] | 3.9[a] | 4.0[a] |
| Haze - 40 mil (%) (ASTM D1003) | 34 ± 2 | 37.3 ± 0.4 | 42.2 ± 0.4 |
| 20° Gloss - 40 mil (%) (ASTM D245) | 105 ± 1 | 101.6 ± 0.6 | 96.6 ± 0.7 |

[a]ASTM D1238, 2.16 kg, 230° C. (MFR).
The prefix 'Ex' denotes an inventive example
The prefix 'CE' denotes a comparative example P/E-1 is blended with E/O-1, E/H-1, and E/B-1. A summary of the properties of the blends in comparison with P/E-1, alone is contained in Table II. As can be seen from Table II, the inventive blends provide excellent physical properties (including elasticity) while at the same time exhibiting enhanced crystallization properties (as indicated by the peak crystallization temperature (Tc).

The inventive blend of Ex 1 was blended with PP-1. The results are shown in Table III. As can be seen from Table III, the formulation comprising the composition of Ex 1 with PP-1 provides an excellent formulation providing excellent physical properties, including, but not limited to, values for haze and gloss as good as the comparative examples. In particular, the inventive composition has a desirable combination of stiffness (as measured by flexural modulus), toughness (as measured by Izod), and optic properties (as measured by tests including Haze). This combination of high stiffness, high toughness, and low haze are particularly desirable for applications including but not limited to durable packaging (i.e. re-usable containers for food and non-food items) and rigid packaging (i.e. single use containers typically sold with prepared or preserved foods contained therein). The particular balance of stiffness-toughness-haze finds utility in such applications where high stiffness is required to maintain structural rigidity at minimum thickness, toughness is required to prevent breaks in case of impact at ambient or sub-ambient temperatures, and low haze is required to properly display the contents.

We claim:

1. A polyolefin elastomeric composition, the composition consisting essentially of:
   (a) a propylene-based elastomer having at least seventy-five weight percent (75 wt %) units derived from propylene and from thirteen to seventeen weight percent (13-17 wt %) units derived from a C2, or a C4-C10 alpha olefin, the propylene-based elastomer exhibiting:
      (1) a heat of fusion by DSC analysis of from 1 Joules/gram to 35 Joules/gram;
      (2) a weight average molecular (Mw) of from 54000 to 875000 g/mol; and
      (3) a permanent set of less than 40%; and
   (b) a homogeneous ethylene-alpha olefin interpolymer selected from a substantially linear polyethylene and a homogeneously branched linear polyethylene having a molecular weight distribution (Mw/Mn) of less than 3.5, a density from 0.885 to 0.915 g/ml, and a heat of fusion of from 65 to 125 Joules/gram, wherein the weight ratio of the propylene-based elastomer to the homogeneous ethylene-alpha olefin interpolymer is from 97:3 to 80:20, and wherein the composition exhibits a heat of fusion from 2 to 55 Joules/gram, and a 2% secant flexural modulus of less than 69 MPa.

2. The polyolefin elastomeric composition of claim 1, wherein the propylene-based elastomer exhibits a heat of fusion of from 2 to 15 Joules/gram.

3. The polyolefin elastomeric composition of claim 1, wherein the composition exhibits a 2% secant flexural modulus of less than 25 MPa.

4. The polyolefin elastomeric composition of claim 1, wherein the composition has a molecular weight distribution (Mw/Mn) of from 2.0 to 5.0.

5. A polyolefin elastomeric composition, the composition consisting essentially of:
   (a) a propylene-based elastomer having at least seventy-five weight percent (75 wt %) units derived from propylene and from eleven to seventeen weight percent (11-17 wt %) units derived from ethylene, the propylene-based elastomer exhibiting:
      (1) a heat of fusion by DSC analysis of from 2 Joules/gram to 15 Joules/gram;
      (2) a molecular weight distribution (Mw/Mn) of less than 3.5;
      (3) a melt flow rate of from 2 to 30 g/10 minutes; and
      (4) substantially isotactic propylene sequences; and
   (b) a homogeneous ethylene-alpha olefin interpolymer selected from a substantially linear polyethylene and a homogeneously branched linear polyethylene comprising from 91 to 97 mole percent units derived from ethylene and 3 to 9 mole percent units derived from an alpha olefin having from 4 to 12 carbon atoms and having a density of from 0.890 to 0.910 g/ml, a molecular weight distribution (Mw/Mn) of less than 3.5, an index of refraction from 1.503 to 1.509, and a heat of fusion of from 75 to 115 Joules/gram, wherein the weight ratio of the propylene-based elastomer to the homogeneous ethylene-alpha olefin interpolymer is from 97:3 to 80:20, and wherein the composition has a molecular weight distribution (Mw/Mn) of between 1.7 and 10 and exhibits a heat of fusion from 2 to 55 Joules/gram, a peak crystallization temperature of at least 40° C., and a 2% secant flexural modulus of less than 67 MPa.

6. The polyolefin elastomeric composition of claim 5, wherein the composition exhibits a peak crystallization temperature of at least 60° C.

7. The polyolefin elastomeric composition of claim 5, wherein the homogeneous ethylene-alpha olefin interpolymer has a melt index of from 0.5 to 15 g/10 min and a molecular weight distribution (Mw/Mn) of less than 3.0.

8. The polyolefin elastomeric composition of claim 5, wherein the propylene-based elastomer has a molecular weight distribution (Mw/Mn) of less than 3.0 and is manufactured using a metallocene catalyst system.

9. The polyolefin elastomeric composition of claim 5, wherein the propylene-based elastomer has a broad crystallinity distribution.

10. The polyolefin elastomeric composition of claim 9, wherein the propylene-ethylene copolymer is manufactured using a nonmetallocene metal-centered, heteroaryl ligand catalyst.

11. The polyolefin elastomeric composition of claim 10, wherein the propylene-based elastomer has an RCD of at least 15%.

12. The polyolefin elastomeric composition of claim 5, wherein the propylene-based elastomer is a propylene-ethylene copolymer having an HCF fraction of at least 0.1 Joules/gram.

13. The polyolefin elastomeric composition of claim 9, wherein the propylene-based elastomer has an Upper Temperature Quartile Range of at least 4.0° C.

14. A polyolefin elastomeric composition, the composition consisting essentially of:
   (a) a propylene-based elastomer having at least seventy-five weight percent (75 wt %) units derived from propylene and from twelve to sixteen weight percent (12-16 wt %) units derived from ethylene, the propylene-based elastomer exhibiting:
      (1) a heat of fusion by DSC analysis of from 2 Joules/gram to 12 Joules/gram;
      (2) a molecular weight distribution (Mw/Mn) of less than 3.5;
      (3) a melt flow rate of from 2 to 30 g/10 minutes;
      (4) substantially isotactic propylene sequences; and
   (b) a homogeneous ethylene-alpha olefin interpolymer selected from a substantially linear ethylene/1-octene copolymer and a homogeneously branched linear ethylene/1-octene copolymer comprising from 91 to 97 mole percent units derived from ethylene and 3 to 9 mole percent units derived from 1-octene and having a density of from 0.895 to 0.905 g/ml, a molecular weight distribution (Mw/Mn) of less than 2.5, an index of refraction from 1.505 to 1.507, and a heat of fusion of from 89 to 101 Joules/gram, wherein the weight ratio of the propylene-based elastomer to the homogeneous ethylene-alpha olefin interpolymer is from 90:10 to 84:16, and wherein the composition has a molecular weight distribution (Mw/Mn) of between 2.0 and 5.0, exhibits a heat of fusion from 2 to 50 Joules/gram, a peak crystallization temperature of at least 40° C., and a 2% secant flexural modulus of less than 30 MPa.

15. The polyolefin elastomeric composition of claim 14, wherein the propylene-based elastomer has a broad crystallinity distribution.

16. The polyolefin elastomeric composition of claim 15, wherein the propylene-based elastomer is a propylene-ethylene copolymer having a molecular weight distribution (Mw/Mn) of less than 3.0.

17. The polyolefin elastomeric composition of claim 16, wherein the propylene-ethylene copolymer is manufactured using a nonmetallocene metal-centered, heteroaryl ligand catalyst.

18. The polyolefin elastomeric composition of claim 17, wherein the propylene-based elastomer has an RCD of at least 15%.

19. The polyolefin elastomeric composition of claim 14, wherein the propylene-based elastomer is a propylene-ethylene copolymer having a HCF fraction of at least 0.1 Joules/gram.

20. The polyolefin elastomeric composition of claim 15, wherein the propylene-based elastomer has an Upper Temperature Quartile Range of at least 4.0° C.

* * * * *